(12) United States Patent
Nauka et al.

(10) Patent No.: US 11,759,863 B2
(45) Date of Patent: Sep. 19, 2023

(54) THREE-DIMENSIONAL PRINTING

(71) Applicant: HEWLETT-PACKARD DEVELOPMENT COMPANY, L.P., Spring, TX (US)

(72) Inventors: Krzysztof Nauka, Palo Alto, CA (US); Thomas Anthony, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 37 days.

(21) Appl. No.: 16/607,385

(22) PCT Filed: Oct. 30, 2017

(86) PCT No.: PCT/US2017/058966
§ 371 (c)(1),
(2) Date: Oct. 23, 2019

(87) PCT Pub. No.: WO2019/088965
PCT Pub. Date: May 9, 2019

(65) Prior Publication Data
US 2021/0283690 A1 Sep. 16, 2021

(51) Int. Cl.
*B22F 10/50* (2021.01)
*B33Y 10/00* (2015.01)
(Continued)

(52) U.S. Cl.
CPC ............. *B22F 10/50* (2021.01); *B22F 10/14* (2021.01); *B33Y 10/00* (2014.12); *B33Y 40/00* (2014.12); *B33Y 70/00* (2014.12); *B22F 2998/10* (2013.01)

(58) Field of Classification Search
CPC ................. B23K 15/086; B28B 1/001; B22F 2003/1057
See application file for complete search history.

(56) References Cited

U.S. PATENT DOCUMENTS 4,898,699 A   2/1990   Hofmann et al.
5,073,473 A   12/1991  Koya et al.
(Continued)

FOREIGN PATENT DOCUMENTS

CN   101160635 A   4/2008
CN   102217429 A   10/2011
(Continued)

OTHER PUBLICATIONS

Ryu, J. et al. "Reactive Sintering of Copper Nanoparticles Using Intense Pulsed Light for Printed Electronics". 2010. JOurnal of electronic materials. 40. 1. p. 42-50. (Year: 2010).*
(Continued)

*Primary Examiner* — Nicholas A Wang
(74) *Attorney, Agent, or Firm* — Shook, Hardy & Bacon L.L.P.

(57) ABSTRACT

In an example of a three-dimensional (3D) printing method, a metallic build material is applied. A patterning fluid, including a metal salt, is selectively applied on at least a portion of the metallic build material. Prior to an application of additional build material, the metallic build material is exposed to light irradiation to cause the metal salt to reach a thermal decomposition temperature and thermally decompose to a metal. During the exposing, the metallic build material is maintained below a sintering temperature of the metallic build material.

8 Claims, 8 Drawing Sheets

(51) Int. Cl.
B33Y 40/00 (2020.01)
B33Y 70/00 (2020.01)
B22F 10/14 (2021.01)

(56) References Cited

U.S. PATENT DOCUMENTS

| | | | |
|---|---|---|---|
| 6,508,980 B1* | 1/2003 | Sachs | B22F 10/10 419/45 |
| 9,339,972 B2 | 5/2016 | Gordon | |
| 9,908,819 B1* | 3/2018 | Kollenberg | C04B 35/63 |
| 2002/0045027 A1 | 4/2002 | Sawada et al. | |
| 2003/0209836 A1* | 11/2003 | Sherwood | B33Y 50/02 425/130 |
| 2004/0197493 A1* | 10/2004 | Renn | H01L 21/6715 427/596 |
| 2005/0214190 A1 | 9/2005 | Hyeon et al. | |
| 2006/0198963 A1* | 9/2006 | Chernyshov | C09D 5/024 427/487 |
| 2009/0007724 A1* | 1/2009 | Liu | B22F 10/10 75/230 |
| 2015/0181714 A1 | 6/2015 | Ahmed et al. | |
| 2017/0120332 A1 | 5/2017 | DeMuth et al. | |
| 2017/0175293 A1 | 6/2017 | Banin et al. | |

FOREIGN PATENT DOCUMENTS

| | | |
|---|---|---|
| CN | 105694820 A | 6/2016 |
| EP | 1039980 | 11/2004 |
| JP | 63-271257 A | 11/1988 |
| JP | 2002-155159 A | 5/2002 |
| TW | 201726281 A | 8/2017 |
| WO | 2016/053305 A1 | 4/2016 |
| WO | WO2017131760 A1 | 8/2017 |
| WO | WO-2017184127 A1 | 10/2017 |
| WO | 2018/199995 A1 | 11/2018 |

OTHER PUBLICATIONS

Draper, G. et al. "Fabrication of Elemental Copper by Intense Pulsed Light Processing of a Copper Nitrate Hydroxide Ink." 2015. Applies materials and interfaces. 7. p. 16478-16485. (Year: 2015).*

Hwang, H-J. et al. "All-photonic Drying and Sintering Process via Flash White Light Combined with Deep-UV and Near-infrared Irradiation for Highly Conductive Copper Nano-ink" Scientific reports 6 (2016): 19696.

Kim, Hak-Sung et al. "Intense Pulsed Light Sintering of Copper Nanoink for Printed Electronics" Applied Physics A 97, No. 4 (Dec. 2009): pp. 791-798.

* cited by examiner

THREE-DIMENSIONAL PRINTING

BACKGROUND

Three-dimensional (3D) printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material. This is unlike traditional machining processes, which often rely upon the removal of material to create the final part. Some 3D printing methods use chemical binders or adhesives to bind build materials together. Other 3D printing methods involve at least partial curing or fusing or melting of the build material. For some materials, at least partial melting may be accomplished using heat-assisted extrusion, and for some other materials (e.g., polymerizable materials), curing or fusing may be accomplished using, for example, ultraviolet light or infrared light.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
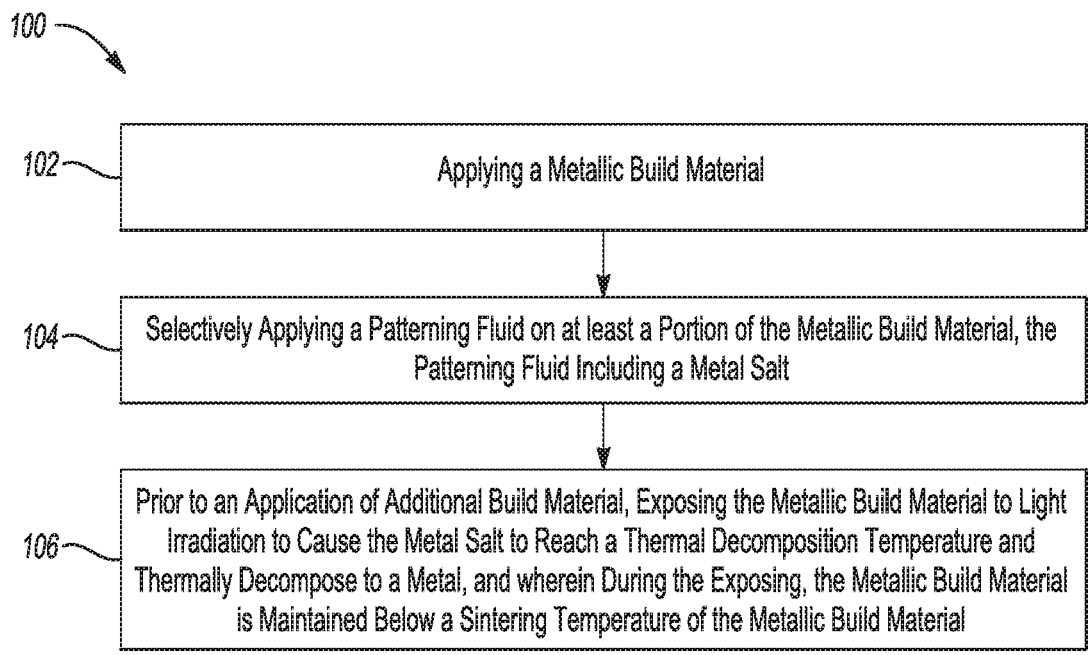
FIG. 1 is a flow diagram illustrating an example of a 3D printing method disclosed herein.

In some examples of three-dimensional (3D) printing, a patterning fluid is selectively applied to a layer of metallic build material (also referred to as build material particles), and then another layer of the metallic build material is applied thereon. The patterning fluid may be applied to this other layer of build material, and these processes may be repeated to form a green part/body (the "green" portion of such terms does not connote color, but rather indicates that the part is not yet fully processed) of the 3D part that is ultimately to be formed. The patterning fluid may include a binder that holds the metallic build material particles of the green part together. After the green part is formed, the green part may be extracted from the non-patterned build material and exposed to heat to sinter the metallic build material in the green part to form a final 3D object having a sufficient density.

The mechanical strength of the green part can affect the ability of the green part to be extracted from the non-patterned metallic build material. If the green part does not have sufficient mechanical strength, it may be unable to withstand cleaning (e.g., with a brush and/or an air jet). If the green part is not cleaned or is not sufficiently cleaned, some non-patterned metallic build material may remain on the intermediate part's surface. Non-patterned build material remaining on the green part's surface (when the intermediate part is exposed to heat to sinter the build material to form the final 3D part) can affect the precision and quality of the part that is formed. In some cases, intermediate parts with insufficient mechanical strength may be damaged during extraction. This damage may be visible in the final part that is formed, which is undesirable. Alternatively, a new green part may have to be printed to replace the damaged green part, which may be expensive and/or time consuming.

In some cases, the green part along with the entire non-patterned build material volume may be subjected to a thermal treatment after printing the green part, but before extraction from the non-patterned build material, in order to strengthen the green part. Such a thermal treatment adds time and cost to the additive manufacturing process.

Additionally, post-processing of a green part may involve removing the binder (used to hold the metallic build material particles of the green part together) via dissolution or via burning as part of the sintering process. If some binders are not removed, they may interfere with the integrity of the final 3D object. However, binder removal may add time and/or introduce additional chemicals (e.g., for binder dissolution) to the 3D printing process. Additionally, removal of gaseous byproducts (resulting from the decomposition of the binder) from region(s) below the surface of the 3D object may be challenging and/or may limit the size of the 3D object that can be printed.

Rather than forming a green part in the manner previously described, the examples of the 3D printing method disclosed herein utilize a layer-by-layer patterning and light irradiation sequencing process that increases the bonding strength of each layer as it is being printed. The patterning utilizes a patterning fluid that includes a dissolved or dispersed metal salt, and the light irradiation sequencing initiates chemical reaction(s) that cause the metal salt to thermally decompose and form a metal (e.g., via a solid state reaction or reaction of a solid with a gas) during printing of the individual layers, without causing the metallic build material to prematurely sinter. The light irradiation sequencing also causes the formed metal to diffusionally mix with and bind to the metallic build material. The formed metal may be in the form of nanoparticles having a particle size ranging from about 1 nm to less than 1000 nm, which may allow the metal to melt at a lower temperature (as compared to the metallic build material). When molten, these metal nanoparticles can wet adjacent particles of the metallic build material, which mechanically bonds and increases the bond strength between the build material particles as the various layers are printed. The improved bonding strength of the individual layers increases the mechanical strength of the overall intermediate part or final part that is formed in the 3D printer.

As mentioned, the metal that is formed in the layer-by-layer process binds the metallic build material in the patterned portions. It is to be understood that the light irradiation sequencing can be controlled by calibrating the light irradiation intensity and/or duration with respect to the temperature of metallic build material, and can be terminated when a desired strength of the printed layer is achieved. As described further herein, the temperature may be used as an indicator of the progress of the reaction(s).

In some examples, the light irradiation sequencing is controlled so that intermediate part layers, and ultimately an intermediate part, are formed. As used herein, the term "intermediate part" refers to a part precursor that has a shape representative of the final 3D printed part and that includes non-sintered metallic build material particles bound by the metal that is generated by at least thermal decomposition of the metal salt in the patterning fluid. It is to be understood that any metallic build material particle that is not bound by the metal is not considered to be part of the intermediate part, even if it is adjacent to or surrounds the intermediate part. In these examples, the metal binder that is formed from the metal salt provides the intermediate part with enough mechanical strength that it is able to be handled or to withstand extraction from the build area platform without being deleteriously affected (e.g., the shape is not lost, damaged, etc.). This intact intermediate part can then be exposed to an additional annealing process that can sinter the metallic build material to form a final part, and that can also chemically transform any metal salt and/or any decomposition product(s) that remain in the intermediate part.

Thermally decomposing the metal salt to the metal layer-by-layer may reduce (e.g., when the intermediate part is produced) sintering time in a high temperature furnace, which may reduce the cost and time of the printing process. Additionally, thermally decomposing the metal salt to the metal layer-by-layer allows for easier removal of gaseous byproducts (e.g., $H_2O$, $O_2$, CO, $CO_2$, etc.) as compared to the removal of gaseous byproducts from an entire part at once.

Intermediate parts in which the metallic build material is bound with metal formed from decomposed metal salt can have improved strength compared to alternative binders (e.g., polymer binders). In addition, a metal binder will not lose its strength during the sintering process, thereby enabling 3D geometries including cantilevers and unsupported beams to be sintered without distortion (sagging, bending, etc.) or cracking due to gravitational force.

In other examples, the light irradiation sequencing is performed in accordance with the method(s) disclosed herein in order to form the metal binder from the metal salt without prematurely sintering the metallic build material. In these other examples, however, each layer is also exposed to additional light irradiation which causes the patterned metallic build material to sinter and form a final part layer. The metal (generated by thermal decomposition of the metal salt of the patterning fluid) may increase the energy absorption within the patterned portion as compared to the non-patterned portion. This additional energy may cause the patterned metallic build material to sinter, while the non-patterned metallic build material does not sinter. Additionally, the metal (generated by thermal decomposition of the metal salt of the patterning fluid) may increase the pathways for solid state diffusion between the patterned metallic build material, as compared to the non-patterned metallic build material. The additional pathways for solid state diffusion (which drives sintering) may speed up the sintering of the patterned metallic build material, while the non-patterned metallic build material does not sinter. This process forms a layer of the final part, and can be repeated to form a final part that is not exposed to subsequent processing (e.g., annealing).

As used herein the term "final part" refers to a part that is able to be used for its desired or intended purpose. Each example of the final part includes metal binder (where the metal has been generated by thermal decomposition of the metal salt of the patterning fluid) and also sintered metallic build material particles that may merge together to form a continuous body. By "continuous body," it is meant that the metallic build material particles are merged together with the metal binder to form a single part with sufficient mechanical strength to be used for the desired or intended purpose of the final part, in addition to being able to withstand extraction from the printer without being deleteriously affected (e.g., the shape is not lost, damaged, etc.).

Additionally, both the intermediate part and the final part formed by the examples of the method disclosed herein have sufficient mechanical strength to withstand cleaning (e.g., with a brush and/or an air jet) without being deleteriously affected.

Referring now to FIG. 1, FIG. 2 and FIGS. 3A through 3F, examples of a three-dimensional (3D) printing method 100, 200, 300 are depicted. Prior to execution of the method 100, 200, 300 or as part of the method 100, 200, 300 a controller 50 (see, e.g., FIG. 6) may access data stored in a data store 52 (see, e.g., FIG. 6) pertaining to a 3D part that is to be printed. The controller 50 may determine the number of layers of metallic build material 16 that are to be formed and the locations at which the patterning fluid 20 from the applicator 24 is to be deposited on each of the respective layers.

As shown in FIG. 1, an example of the three-dimensional (3D) printing method 100 comprises: applying a metallic build material 16 (reference numeral 102); selectively applying a patterning fluid 20 on at least a portion 30 of the metallic build material 16, the patterning fluid 20 including a metal salt 22 (reference numeral 104); and prior to an application of additional build material 16, exposing the metallic build material 16 to light irradiation to cause the metal salt 22 to reach a thermal decomposition temperature and thermally decompose to a metal 22', and wherein during the exposing, the metallic build material 16 is maintained below a sintering temperature of the metallic build material 16 (reference numeral 106).

Figure 2:
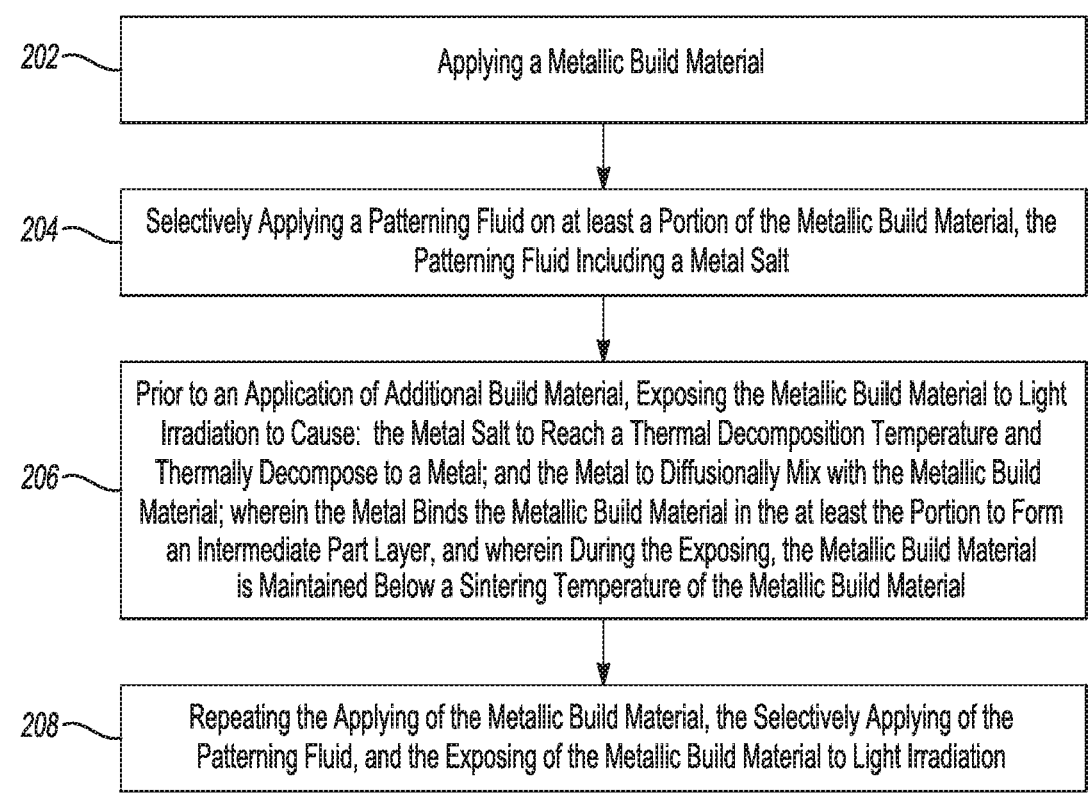
FIG. 2 a flow diagram illustrating another example of a method for 3D printing disclosed herein.

As shown in FIG. 2, another example of the three-dimensional (3D) printing method 200 comprises: applying a metallic build material 16 (reference numeral 202); selectively applying a patterning fluid 20 on at least a portion 30 of the metallic build material 16, the patterning fluid 20 including a metal salt 22 (reference numeral 204); prior to an application of additional build material 16, exposing the metallic build material 16 to light irradiation to cause: the metal salt 22 to reach a thermal decomposition temperature and thermally decompose to a metal 22'; and the metal 22' to diffusionally mix with the metallic build material 16; wherein the metal binds the metallic build material 16 in the at least the portion 30 to form an intermediate part layer, and wherein during the exposing, the metallic build material 16 is maintained below a sintering temperature of the metallic build material 16 (reference numeral 206); and repeating the applying of the metallic build material 16, the selectively applying of the patterning fluid 20, and the exposing of the metallic build material 16 to light irradiation (208).

Figure 3A:
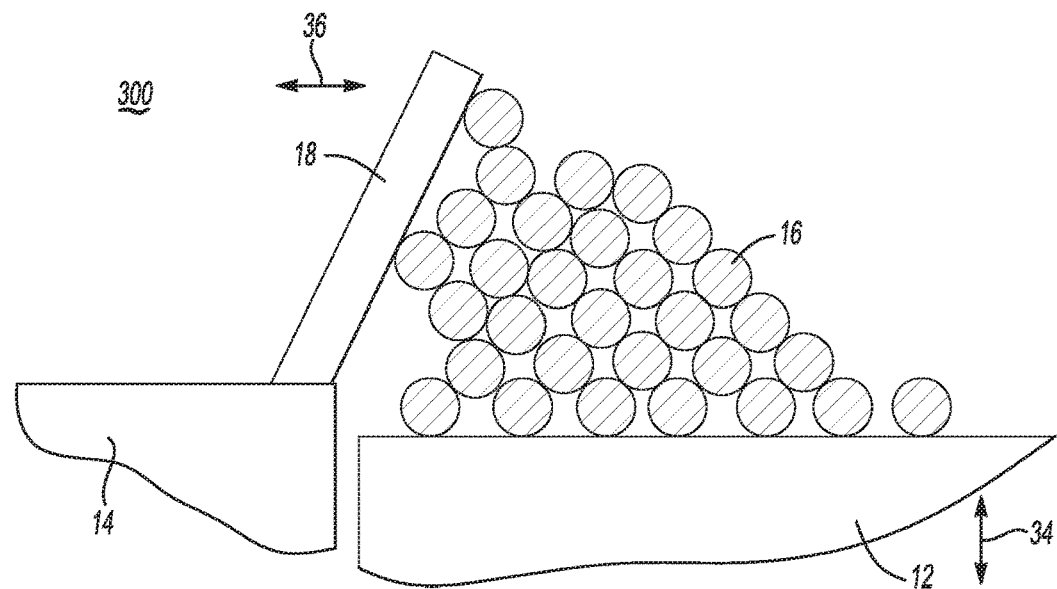
FIGS. 3A through 3F are schematic and partially cross-sectional cutaway views depicting the formation of a 3D part using an example of a 3D printing method disclosed herein.
Figure 3B:
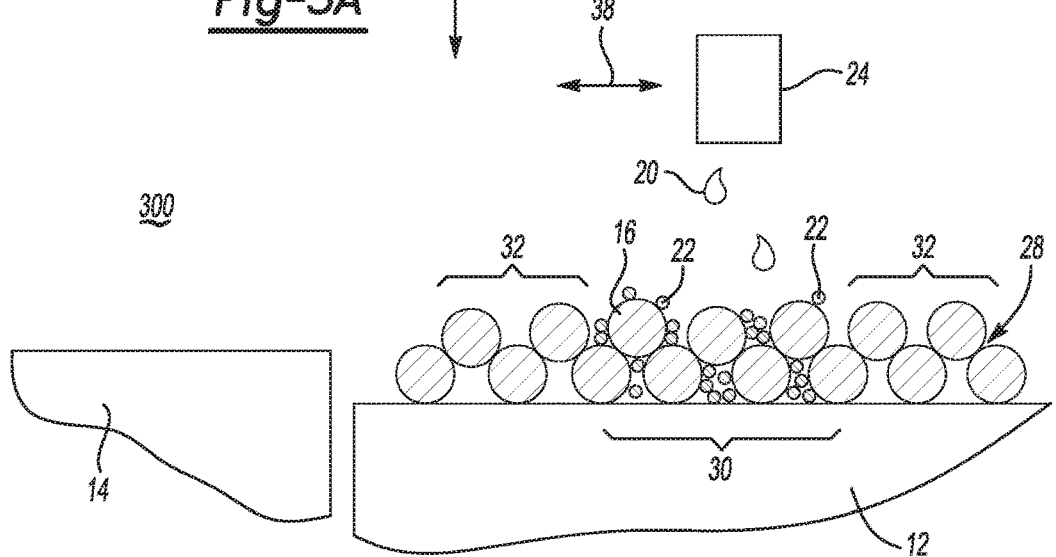

As shown at reference numeral 102 in FIG. 1, at reference numeral 202 in FIG. 2, and in FIGS. 3A and 3B, the method 100, 200, 300 includes applying the metallic build material 16. The metallic build material 16 may be any particulate metallic material.

In an example, the metallic build material 16 may have the ability to sinter into a continuous body to form the final part 42 when heated to the sintering temperature. It is to be understood that the sintering temperature may vary, depending, in part, upon the alloy composition and phase(s) of the metallic build material 16. For example, stainless steel alloys have sintering temperatures ranging from 800° C. to 1450° C., whereas the range for aluminum alloys is from about 450° C. to 650° C.

In an example, the metallic build material 16 is a single phase metallic material composed of one element. In this example, the sintering temperature is below the melting point of the single element.

In another example, the metallic build material 16 is composed of two or more elements, which may be in the form of a single phase metallic alloy or a multiple phase metallic alloy. In these other examples, melting generally occurs over a range of temperatures, and the sintering temperature is below this range of temperatures.

Single elements or alloys may be used as the metallic build material 16. Some examples of the metallic build material 16 include steels, stainless steel, bronzes, titanium (Ti) and alloys thereof, aluminum (Al) and alloys thereof, nickel (Ni) and alloys thereof, cobalt (Co) and alloys thereof, iron (Fe) and alloys thereof, nickel cobalt (NiCo) alloys, gold (Au) and alloys thereof, silver (Ag) and alloys thereof, platinum (Pt) and alloys thereof, and copper (Cu) and alloys thereof. Some specific examples include AlSi10Mg, 2xxx series aluminum, 4xxx series aluminum, CoCr MP1, CoCr SP2, MaragingSteel MS1, Hastelloy C, Hastelloy X, NickelAlloy HX, Inconel IN625, Inconel IN718, SS GP1, SS 17-4PH, SS 316L, Ti6Al4V, and Ti-6Al-4V ELI7. While several example alloys have been provided, it is to be understood that other alloy build materials may be used.

Any metallic build material 16 may be used that is in powder form at the outset of the 3D printing method 100, 200, 300. As such, the melting point, solidus temperature (where melting is initiated), eutectic temperature (the temperature at which a single phase liquid completely solidifies into a two phase solid), and/or peritectic temperature (the point where a single phase solid transforms into a two phase solid plus liquid mixture, where the solid above the peritectic temperature is of a different phase than the solid below the peritectic temperature) of the metallic build material 16 are above the temperature of the environment in which the patterning portion of the 3D printing method 100, 200, 300 is performed (e.g., above 100° C.). In some examples, the metallic build material 16 may have a melting point ranging from about 850° C. to about 3500° C. In other examples, the metallic build material 16 may be an alloy having a range of melting points.

The metallic build material particles 16 may be made up of similarly sized particles or differently sized particles. In the examples shown herein, the metallic build material 16 includes similarly sized particles. The term "size", as used herein with regard to the metallic build material particles 16, refers to the diameter of a spherical particle, or the average diameter of a non-spherical particle (i.e., the average of multiple diameters across the particle), or the volume-weighted mean diameter of a particle distribution. In an example, the average size of the metallic build material particles 16 ranges from about 1 μm to about 200 μm. In another example, the average size of the metallic build material particles 16 ranges from about 10 μm to about 150 μm. In still another example, the average size of the metallic build material particles 16 ranges from 20 μm to about 90 μm. In yet another example, the average size of the metallic build material particles 16 is about 40 μm.

In an example, the metallic build material particles 16 may have a Gaussian particle size distribution. In another example, the metallic build material particles 16 may have several overlapping Gaussian particle size distributions.

Figure 6:
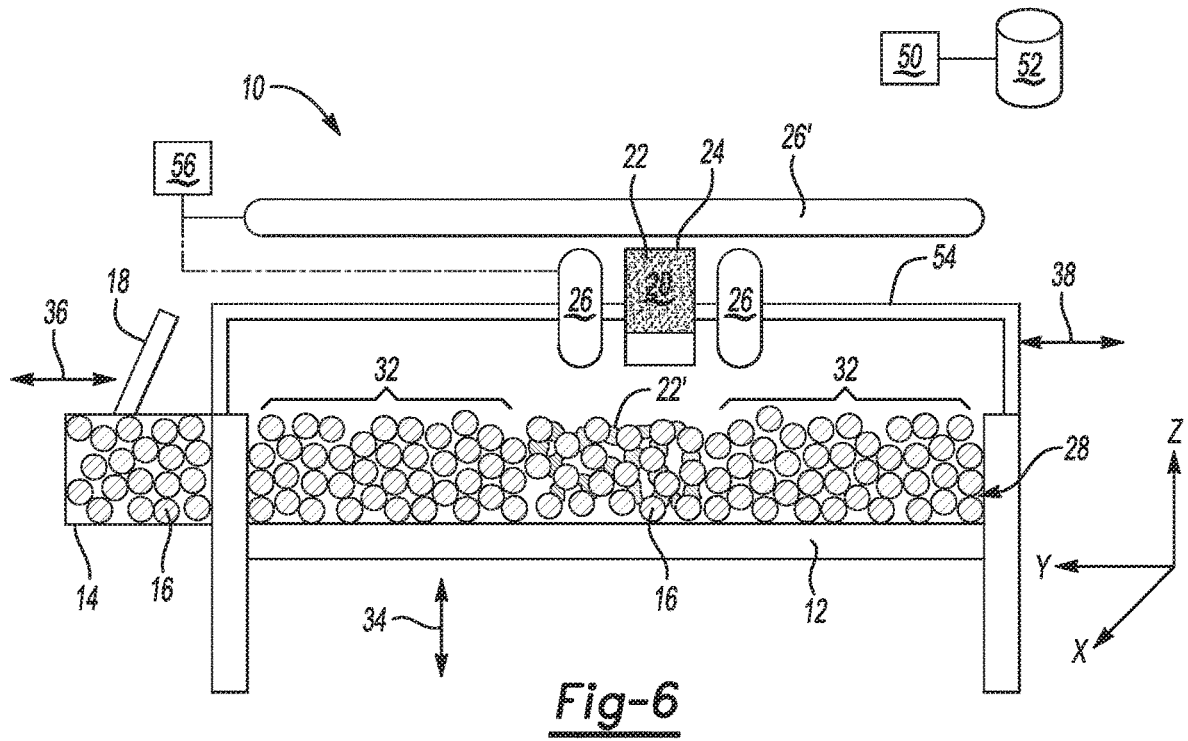
FIG. 6 is schematic and partially cross-sectional view of an example of a 3D printing system disclosed herein.

In the example shown in FIGS. 3A and 3B, applying the metallic build material 16 may include the use of a printing system (e.g., printing system 10 shown in FIG. 6). The printing system may include a build area platform 12, a build material supply 14 containing metallic build material particles 16, and a build material distributor 18.

The build area platform 12 receives the metallic build material 16 from the build material supply 14. The build area platform 12 may be moved in a direction as denoted by the arrow 34, e.g., along the z-axis, so that the metallic build material 16 may be delivered to the build area platform 12 or to a previously formed layer. In an example, when the metallic build material particles 16 are to be delivered, the build area platform 12 may be programmed to advance (e.g., downward) enough so that the build material distributor 18 can push the metallic build material particles 16 onto the build area platform 12 to form a substantially uniform layer 28 of metallic build material 16 thereon. The build area platform 12 may also be returned to its original position, for example, when a new part is to be built.

The build material supply 14 may be a container, bed, or other surface that is to position the metallic build material particles 16 between the build material distributor 18 and the build area platform 12.

The build material distributor 18 may be moved in a direction as denoted by the arrow 36, e.g., along the y-axis, over the build material supply 14 and across the build area platform 12 to spread the layer 28 of the metallic build material 16 over the build area platform 12. The build material distributor 18 may also be returned to a position adjacent to the build material supply 14 following the spreading of the metallic build material particles 16. The build material distributor 18 may be a blade (e.g., a doctor blade), a roller, a combination of a roller and a blade, and/or any other device capable of spreading the metallic build material 16 over the build area platform 12. For instance, the build material distributor 18 may be a counter-rotating roller.

The build area platform 12 (including sidewalls) and build material layer 28 may be heated to above ambient temperature by additional heaters (not shown in FIG. 6).

As shown in FIG. 3A, the build material supply 14 may supply the metallic build material particles 16 into a position so that they are ready to be spread onto the build area platform 12. The build material distributor 18 may spread the supplied metallic build material particles 16 onto the build area platform 12. The controller 50 may process control build material supply data, and in response control the build material supply 14 to appropriately position the metallic build material particles 16, and may process control spreader data, and in response control the build material distributor 18 to spread the supplied metallic build material particles 16 over the build area platform 12 to form the layer 28 of metallic build material 16 thereon. In other examples (not shown), the build distributor 18 may sprinkle the metallic build material particles 16 over the build area platform 12 to form the layer 28 of metallic build material 16 thereon. While several examples have been provided, it is to be understood that other techniques may be used to substantially uniformly apply the build material particles 16. As shown in FIG. 3B, one build material layer 28 has been formed.

The layer 28 of metallic build material 16 has a substantially uniform thickness across the build area platform 12. In an example, the thickness of the build material layer 28 is about 100 μm. In another example, the thickness of the build material layer 28 ranges from about 30 μm to about 300 μm, although thinner or thicker layers may also be used. For example, the thickness of the build material layer 28 may range from about 20 μm to about 500 μm, or from about 50 μm to about 80 μm. The layer thickness may be about 2× (i.e., 2 times) the particle diameter (as shown in FIG. 3B) at a minimum for finer part definition. In some examples, the layer thickness may be about 1.5× the particle diameter.

As shown at reference numeral 104 in FIG. 1, at reference numeral 206 in FIG. 2, and in FIG. 3B, the methods 100, 200, 300 continue by selectively applying a patterning fluid 20 on at least a portion 30 of the metallic build material 16. The patterning fluid 20 includes the metal salt 22 and a liquid vehicle. In some instances, the patterning fluid 20 consists of the metal salt 22 and the liquid vehicle, without any other components.

When applied to the layer 28 of metallic build material 16, the liquid vehicle is capable of wetting the metallic build material particles 16 and the metal salt 22 is capable of penetrating into the microscopic pores/voids of the build material layer 28 (i.e., the spaces between the metallic build material particles 16).

The metal salt 22 in the patterning fluid 20 is capable of being thermally decomposed to the metal 22' through one or more heat initiated chemical reactions. In some examples, the metal salt 22 thermally decomposes directly to the metal 22' when exposed to a thermal decomposition temperature. In other examples, the metal salt 22 thermally decomposes to a metal oxide (not shown), and then the metal oxide is reduced to generate the metal 22'. In these other examples, the "thermal decomposition temperature" may include several reaction temperatures, some of which correspond with the metal salt decomposition and others of which correspond with the metal oxide reduction. It is to be understood that decomposition of the metal salt to a metal oxide may occur in multiple stages, each corresponding to a distinct chemical decomposition reaction. In still other examples, the metal salt 22 is a hydrated metal salt. In these examples, the hydrated metal salt 22 dehydrates to a dehydrated metal salt, which then thermally decomposes to the metal oxide, which then reduces to generate the metal 22'. In these examples, the "thermal decomposition temperature" may include several reaction temperatures, some of which correspond with the hydrated metal salt dehydration, others of which correspond with the dehydrated metal salt decomposition, and still others of which correspond with the metal oxide reduction. As such, the term "thermal decomposition temperature," as used herein, may encompass a single reaction temperature or several different reaction temperatures, depending upon the metal salt 22 that is used.

The dehydration temperature (when applicable), the decomposition temperature, and the reduction temperature (when applicable) may be determined through a thermogravimetric analysis. These temperatures may be used to determine a suitable light irradiation sequence to initiate the desired chemical reactions to form the metal 22' from the metal salt 22.

Figure 4:
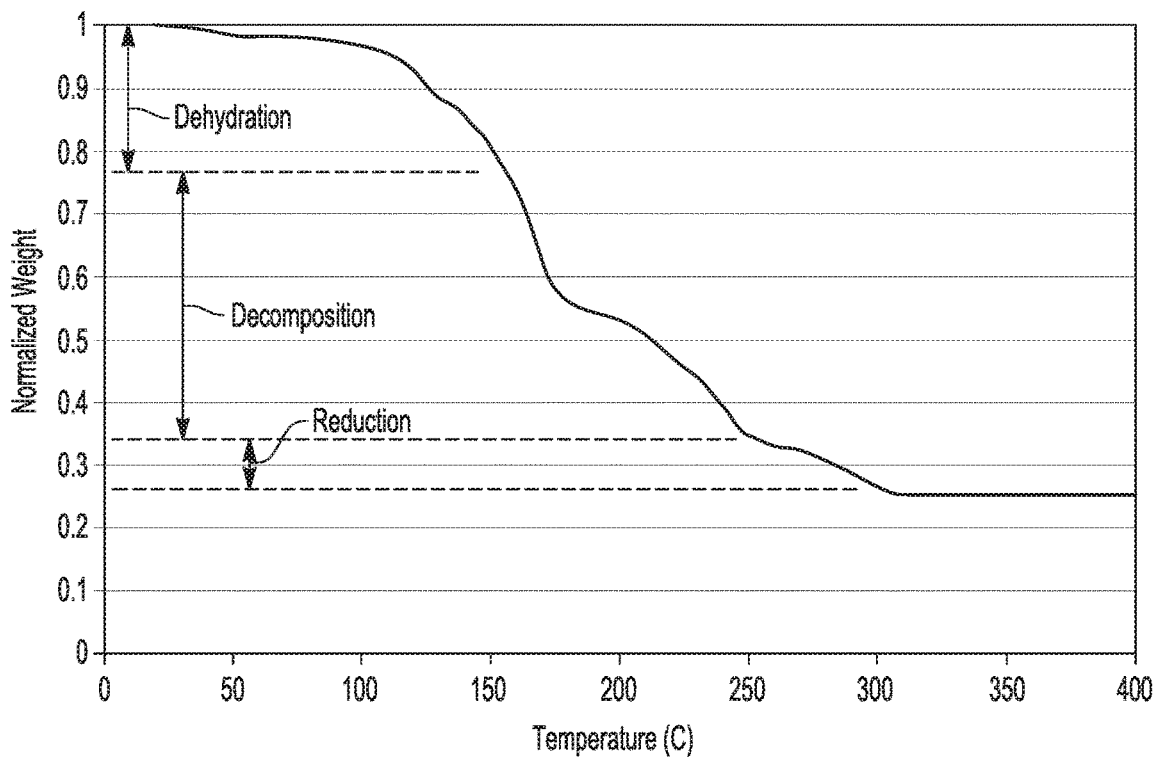
FIG. 4 is a thermogravimetric analysis of copper nitrate trihydrate in forming gas (96 wt % $N_2$ and 4 wt % $H_2$), with the normalized weight values shown on the y-axis and the temperatures to which the sample was heated (in ° C.) shown on the x-axis.

A thermogravimetric analysis of copper nitrate trihydrate (in forming gas, i.e., 96 wt % $N_2$ and 4 wt % $H_2$, which is a reducing gas) is shown in FIG. 4. FIG. 4 shows the normalized weight of a sample that started as copper nitrate trihydrate as it was progressively heated at a ramp rate of 3°/minute in forming gas. In FIG. 4, the normalized weight values are shown on the y-axis and the temperatures to which the sample was heated (in ° C.) are shown on the x-axis. The decreases in normalized weight of the sample, shown in FIG. 4, indicate the formation of the different intermediate products that are formed by a series of chemical reactions that make up the thermal decomposition. The temperatures at which the decreases in normalized weight occur are the reaction temperatures associated with the chemical reactions. The series of chemical reactions that make up the thermal decomposition of copper nitrate trihydrate, i.e., dehydration, decomposition, and reduction, are indicated in FIG. 4. As shown in FIG. 4, copper nitrate trihydrate may absorb enough energy to reach its dehydration temperature (i.e., about 155° C.), then absorb enough energy to reach its decomposition temperature (i.e., about 250° C.), and then absorb enough energy to reach its reduction temperature (i.e., about 295° C.). The dehydration of copper nitrate trihydrate may generate anhydrous copper nitrate. The thermal decomposition of anhydrous copper nitrate may generate cupric oxide, and the reduction of cupric oxide may generate copper.

The thermogravimetric analysis for iron nitrate nonahydrate progressively heated at a ramp rate of 3°/minute in forming gas indicates that iron nitrate trihydrate may absorb enough energy to reach its dehydration temperature (i.e., about 145° C.), then absorb enough energy to reach its decomposition temperature (i.e., about 160° C.), and then absorb enough energy to reach its reduction temperature (i.e., about 590° C.).

The metal 22' is the reduced cation of the metal salt 22. As an example, if the metal salt 22 is copper nitrate or copper formate, then the metal 22' is copper. As another example, if the metal salt 22 is nickel nitrate, then the metal 22' is nickel. The metal 22' may form an at least substantially continuous network/glue that binds the metallic build material particles 16 into the intermediate part 40.

The metal salt 22 may be any metal salt that can thermally decompose (directly or indirectly) to the metal 22' (which is capable of binding the metallic build material particles 16). In an example of the method 100, 200, 300, the metal salt 22 is selected from the group consisting of copper nitrate ($Cu(NO_3)_2$), copper formate ($C_2H_2CuO_4$), copper sulfate ($CuSO_4$), copper oxalate ($CuC_2O_4$), nickel nitrate ($Ni(NO_3)_2$), nickel formate ($C_2H_2NiO_4$), nickel sulfate ($NiSO_4$), nickel oxalate ($NiC_2O_4$), nickel acetate ($Ni(C_2H_3O_2)_2$), nickel thiocyanate ($Ni(SCN)_2$), iron nitrate ($Fe(NO_3)_2$), iron sulfate ($FeSO_4$), iron oxalate ($FeC_2O_4$), iron acetate $Fe(C_2H_3O_2)_2$, manganese nitrate ($Mn(NO_3)_2$), manganese formate ($C_2H_2MnO_4$), manganese oxalate ($MnC_2O_4$), cobalt nitrate ($Co(NO_3)_2$), cobalt formate ($C_2H_2CoO_4$), cobalt sulfate ($CoSO_4$), cobalt oxalate ($CoC_2O_4$), cobalt thiocyanate ($Co(SCN)_2$), chromium nitrate ($Cr(NO_3)_3$), chromium sulfate ($CrSO_4$), magnesium acetate ($Mg(CH_3COO)_2$), magnesium sulfate ($MgSO_4$), neodymium nitrate ($Nd(NO_3)_3$), vanadyl sulfate ($VOSO_4$), zirconium nitrate ($Zr(NO_3)_4$), zinc nitrate ($Zn(NO_3)_2$), zinc sulfate ($ZnSO_4$), silver nitrate ($Ag(NO_3)_2$), and yttrium nitrate ($Y(NO_3)_3$).

Examples of the metal salt 22 that may be a hydrated metal salt include copper nitrate trihydrate, copper formate tetrahydrate, copper sulfate pentahydrate, copper oxalate hemihydrate, nickel nitrate hexahydrate, nickel formate dihydrate, nickel sulfate heptahydrate, nickel oxalate dihydrate, nickel acetate tetrahydrate, iron nitrate nonahydrate, iron sulfate heptahydrate, iron oxalate dihydrate, iron acetate tetrahydrate, manganese nitrate tetrahydrate, manganese formate dihydrate, manganese oxalate dihydrate, cobalt nitrate hexahydrate, cobalt formate dihydrate, cobalt sulfate heptahydrate, cobalt oxalate dihydrate, chromium nitrate nonahydrate, chromium sulfate hexahydrate, magnesium acetate tetrahydrate, magnesium sulfate heptahydrate, neodymium nitrate hexahydrate, vanadyl sulfate pentahydrate, zinc nitrate hexahydrate, zinc sulfate heptahydrate, yttrium nitrate hexahydrate, and combinations thereof. Examples of the metal salt 22 that may thermally decompose directly to the metal 22' include copper formate, copper oxalate, nickel formate, nickel oxalate, nickel thiocyanate, and cobalt thiocyanate. Examples of the metal salt 22 that thermally decompose to a metal oxide (which is then reduced to generate the metal 22') include copper nitrate, copper sulfate, nickel nitrate, nickel sulfate, nickel acetate, iron nitrate, iron sulfate, iron acetate, manganese nitrate, cobalt nitrate, cobalt sulfate, chromium nitrate, chromium sulfate, magnesium acetate, magnesium sulfate, neodymium nitrate, vanadyl sulfate, zirconium nitrate, zinc nitrate, zinc sulfate, and yttrium nitrate.

It is to be understood that the metal 22' will be part of the final part 42. In an example, the metal salt 22 is selected so that the metal 22' formed therefrom is the same material as the metallic build material 16. In another example, the metal salt 22 is selected so that the metal 22' formed therefrom will form an alloy with the metallic build material 16.

The metal salt 22 may be present in the patterning fluid 20 in an amount ranging from about 5 wt % to about 60 wt % (based upon the total weight of the patterning fluid 20). In an example, the metal salt 22 is present in patterning fluid 20 in an amount of about 40 wt %. It is believed that these metal salt loadings provide a balance between the patterning fluid 20 having jetting reliability and binding efficiency.

As mentioned above, the patterning fluid 20 includes the metal salt 22 and the liquid vehicle. As used herein, "liquid vehicle" may refer to the liquid fluid in which the metal salt 22 is dissolved or dispersed to form the patterning fluid 20. A wide variety of liquid vehicles, including aqueous and non-aqueous vehicles, may be used in the patterning fluid 20. In some instances, the liquid vehicle consists of a primary solvent with no other components. In other examples, the patterning fluid 20 may include other components, depending, in part, upon the applicator 24 that is to be used to dispense the patterning fluid 20. Examples of other suitable patterning fluid components include co-solvent(s), surfactant(s), antimicrobial agent(s), and/or anti-kogation agent(s).

The primary solvent may be water or a non-aqueous solvent (e.g., ethanol, acetone, n-methyl pyrrolidone, aliphatic hydrocarbons, etc.). In some examples, the patterning fluid 20 consists of the metal salt 22 and the primary solvent (with no other components). In these examples, the primary solvent makes up the balance of the patterning fluid 20.

Classes of organic co-solvents that may be used in the patterning fluid 20 include aliphatic alcohols, aromatic alcohols, diols, glycol ethers, polyglycol ethers, 2-pyrrolidones, caprolactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, 1,6-hexanediol or other diols (e.g., 1,5-pentanediol, 2-methyl-1,3-propanediol, etc.), ethylene glycol alkyl ethers, propylene glycol alkyl ethers, higher homologs ($C_6$-$C_{12}$) of polyethylene glycol alkyl ethers, triethylene glycol, tetraethylene glycol, tripropylene glycol methyl ether, N-alkyl caprolactams, unsubstituted caprolactams, both substituted and unsubstituted formamides, both substituted and unsubstituted acetamides, and the like. Other examples of organic co-solvents include dimethyl sulfoxide (DMSO), isopropyl alcohol, ethanol, pentanol, acetone, or the like.

Other examples of suitable co-solvents include water-soluble high-boiling point solvents (i.e., humectants), which have a boiling point of at least 120° C., or higher. Some examples of high-boiling point solvents include 2-pyrrolidone (i.e., 2-pyrrolidinone, boiling point of about 245° C.), 1-methyl-2-pyrrolidone (boiling point of about 203° C.), N-(2-hydroxyethyl)-2-pyrrolidone (boiling point of about 140° C.), 2-methyl-1,3-propanediol (boiling point of about 212° C.), and combinations thereof.

The co-solvent(s) may be present in the patterning fluid 20 in a total amount ranging from about 1 wt % to about 50 wt %, based upon the total weight of the patterning fluid 20, depending upon the jetting architecture of the applicator 24. In an example, the total amount of the co-solvent(s) present in the patterning fluid 20 is about 25 wt %, based on the total weight of the patterning fluid 20.

The co-solvent(s) of the patterning fluid 20 may depend, in part upon the jetting technology that is to be used to dispense the patterning fluid 20. For example, if thermal inkjet is to be used, water and/or ethanol and/or other longer chain alcohols (e.g., pentanol) may be the primary solvent (i.e., makes up 35 wt % or more of the patterning fluid 20) and co-solvents. For another example, if piezoelectric inkjet is to be used, water may make up from about 25 wt % to about 30 wt % of the patterning fluid 20, and the primary solvent (i.e., 35 wt % or more) may be ethanol, isopropanol, acetone, etc.

In some examples the liquid vehicle includes surfactant(s) to improve the jettability of the patterning fluid 20. Examples of suitable surfactants include a self-emulsifiable, nonionic wetting agent based on acetylenic diol chemistry (e.g., SURFYNOL® SEF from Air Products and Chemicals, Inc.), a nonionic fluorosurfactant (e.g., CAPSTONE® fluorosurfactants, such as CAPSTONE® FS-35, from DuPont, previously known as ZONYL FSO), and combinations thereof. In other examples, the surfactant is an ethoxylated low-foam wetting agent (e.g., SURFYNOL® 440 or SURFYNOL® CT-111 from Air Products and Chemical Inc.) or an ethoxylated wetting agent and molecular defoamer (e.g., SURFYNOL® 420 from Air Products and Chemical Inc.). Still other suitable surfactants include non-ionic wetting agents and molecular defoamers (e.g., SURFYNOL® 104E from Air Products and Chemical Inc.) or water-soluble, non-ionic surfactants (e.g., TERGITOL™ TMN-6, TERGITOL™ 15-S-7, or TERGITOL™ 15-S-9 (a secondary alcohol ethoxylate) from The Dow Chemical Company). One further example includes anionic surfactants, such as DOWFAX® 2A1 from The Dow Chemical Company.

Whether a single surfactant is used or a combination of surfactants is used, the total amount of surfactant(s) in the patterning fluid 20 may range from about 0.01 wt % to about 10 wt %, based on the total weight of the patterning fluid 20. In an example, the total amount of surfactant(s) in the patterning fluid 20 may be about 3 wt %, based on the total weight of the patterning fluid 20.

The liquid vehicle may also include antimicrobial agent(s). Suitable antimicrobial agents include biocides and fungicides. Example antimicrobial agents may include the NUOSEPT™ (Troy Corp.), UCARCIDE™ (Dow Chemical Co.), ACTICIDE® B20 (Thor), ACTICIDE® M20 (Thor), and combinations thereof. Examples of suitable biocides include an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), and an aqueous solution of methylisothiazolone (e.g., KORDEK® MLX from Dow Chemical Co.).

In an example, the patterning fluid 20 may include a total amount of antimicrobial agents that ranges from about 0.05 wt % to about 1 wt %. In another example, the antimicrobial agent(s) is/are a biocide(s) and is/are present in the patterning fluid 20 in an amount of about 0.25 wt % (based on the total weight of the patterning fluid 20).

An anti-kogation agent may be included in the patterning fluid 20. Kogation refers to the deposit of dried ink (e.g., patterning fluid 20) on a heating element of a thermal inkjet printhead. Anti-kogation agent(s) is/are included to assist in preventing the buildup of kogation. Examples of suitable anti-kogation agents include oleth-3-phosphate (e.g., commercially available as CRODAFOS™ O3A or CRODAFOS™ N-3 acid from Croda), or a combination of oleth-3-phosphate and a low molecular weight (e.g., <5,000) polyacrylic acid polymer (e.g., commercially available as CARBOSPERSE™ K-7028 Polyacrylate from Lubrizol).

Whether a single anti-kogation agent is used or a combination of anti-kogation agents is used, the total amount of anti-kogation agent(s) in the patterning fluid 20 may range from greater than 0.20 wt % to about 0.65 wt %, based on the total weight of the patterning fluid 20.

In some examples, the patterning fluid 20 is devoid of an additional energy absorber. In the examples disclosed herein, the metal salt 22 may absorb a sufficient amount of energy to reach a dehydration temperature, a thermal decomposition temperature, and/or a reduction temperature. The formed metal 22' may increase the light absorption within the patterned region, for example, by changing the emissivity of patterned regions.

As used herein, the term "devoid of" when referring to a component (such as, e.g., an energy absorber) may refer to a composition that does not include any added amount of the component, but may contain residual amounts, such as in the form of impurities. The components may be present in trace amounts, and in one aspect, in an amount of less than 0.1 weight percent (wt %) based on the total wt % of the composition (e.g., patterning fluid 20), even though the composition is described as being "devoid of" the component. In other words, "devoid of" of a component may mean devoid of added component but allows for trace amounts or impurities inherently present in certain ingredients.

It is to be understood that a single patterning fluid 20 may be selectively applied on the portion 30, or multiple patterning fluids 20 may be selectively applied on the portion 30. As an example, multiple patterning fluids 20 may be used to create a desired alloy from the metallic build material 16, the metal 22' generated from the thermal decomposition of the metal salt 22 in one patterning fluid 20, and the metal 22' generated from the thermal decomposition of the metal salt 22 in another patterning fluid 20. As another example, multiple patterning fluids 20 may be used to create a final part 42 with different compositions (e.g., a pure metal and an alloy, or a first alloy and a second alloy) in different regions.

As illustrated in FIG. 3B, the patterning fluid 20 may be dispensed from the applicator 24. The applicator 24 may be a thermal inkjet printhead, a piezoelectric printhead, a continuous inkjet printhead, etc., and the selectively applying of the patterning fluid 20 may be accomplished by thermal inkjet printing, piezo electric inkjet printing, continuous inkjet printing, etc.

The controller 50 may process data, and in response, control the applicator 24 (e.g., in the directions indicated by the arrow 38) to deposit the patterning fluid 20 onto predetermined portion(s) 30 of the build material layer 28 that are to become part of the final part 42. The applicator 24 may be programmed to receive commands from the controller 50 and to deposit the patterning fluid 20 according to a pattern of a cross-section for the layer of the final part 42 that is to be formed. As used herein, the cross-section of the layer of the final part 42 to be formed refers to the cross-section that is parallel to the surface of the build area platform 12. In the example shown in FIG. 3B, the applicator 24 selectively applies the patterning fluid 20 on those portion(s) 30 of the build material layer 28 that is/are to become the first layer of the final part 42. As an example, if the 3D part that is to be formed is to be shaped like a cube or cylinder, the patterning fluid 20 will be deposited in a square pattern or a circular pattern (from a top view), respectively, on at least a portion of the build material layer 28.

As mentioned above, the patterning fluid 20 includes the metal salt 22 and the liquid vehicle. The volume of the patterning fluid 20 that is applied per unit of the metallic build material 16 in the patterned portion 30 may be sufficient to provide enough of the metal salt 22 so that the metallic build material particles 16 in the patterned portion 30 will be bound together (when the metal 22' is generated by the thermal decomposition of the metal salt 22) with enough mechanical strength to withstand the extraction process. The volume of the patterning fluid 20 that is applied per unit of the metallic build material 16 in the patterned portion 30 may depend, at least in part, on the metal salt 22 used, the metal salt loading in the patterning fluid 20, and the metallic build material 16 used.

It is to be understood that portions 32 of the build material layer 28 that do not have the patterning fluid 20 applied thereto also do not have the metal salt 22 introduced thereto. As such, these portions 32 do not become part of the intermediate part 40 or the final part 42 that is ultimately formed.

Figure 3C:
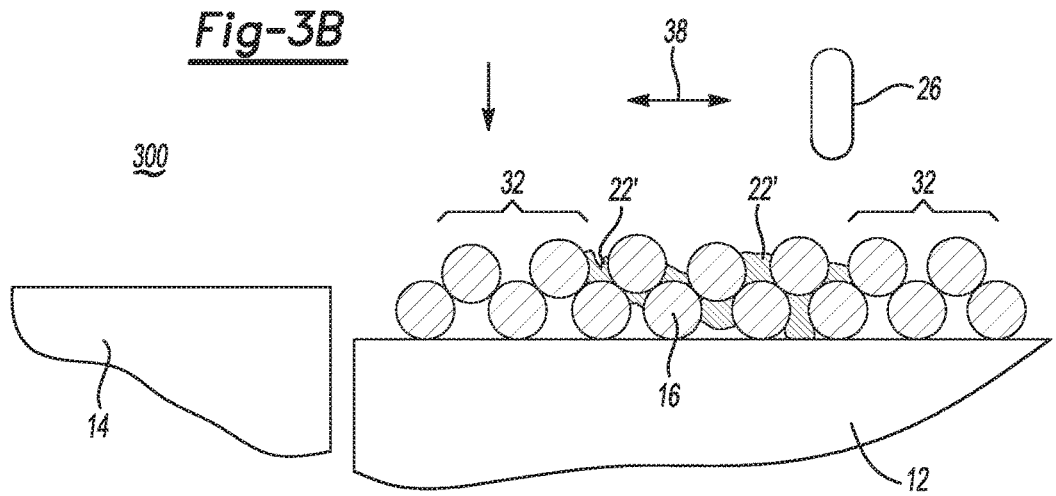

As shown at reference numeral 106 in FIG. 1, at reference numeral 206 in FIG. 2, and FIG. 3C, the method 100, 200, 300 continues by exposing the metallic build material 16 to light irradiation prior to the application of additional build material 16.

As shown at reference numeral 106 in FIG. 1, at reference numeral 206 in FIG. 2, and in FIG. 3C, the metallic build material 16 is exposed to light irradiation layer-by-layer to cause the metal salt 22 to reach the thermal decomposition temperature and thermally decompose to the metal 22'. In some examples of the method 100, 200, 300, the metal salt 22 thermally decomposing to the metal 22' includes a series of chemical reactions, each occurring at a respective reaction temperature, and wherein the method 100, 200, 300 further comprises adjusting energy of the light irradiation (e.g., by adjusting the intensity) to achieve the respective reaction temperatures associated with each of the chemical reactions. Examples of the chemical reactions include dehydration (occurring at a dehydration temperature), a thermal decomposition reaction (occurring at a thermal decomposition temperature), and a reduction reaction (occurring at a reduction temperature).

In an example of the method 100, 200, 300, the metal salt 22 thermally decomposing to the metal 22' includes: a thermal decomposition reaction generating a metal oxide; and a reduction reaction to reduce the metal oxide and generate the metal 22'.

In some other examples of the method 100, 200, 300, the metal salt 22 is a hydrated metal salt, and prior to exposing the metallic build material 16 to light irradiation to cause the metal salt 22 to reach the thermal decomposition temperature and thermally decompose to the metal 22', the method 100, 200, 300 further comprises exposing the metallic build material 16 to light irradiation to cause the hydrated metal salt to reach a dehydration temperature and dehydrate to a dehydrated metal salt. In some examples, causing the hydrated metal salt to reach a dehydration temperature and dehydrate to a dehydrated metal salt may also result in the evaporation of the liquid vehicle of the patterning fluid 20. The evaporation may result in some densification, through capillary action, of the patterned portion 30 of the layer 28.

In some examples of the method 100, 200, 300, the exposing of the metallic build material 16 may include performing a light irradiation sequence to cause the metal salt 22, the metal oxide, or the metal 22' to reach the desired reaction temperature (e.g., dehydration temperature, thermal decomposition temperature, reduction temperature, etc.).

In any of the examples disclosed herein, the light irradiation or light irradiation sequences may include a single pulse/flash or multiple pulses/flashes from the source 26, 26' of light irradiation. In an example, each pulse/flash may emit light irradiation having an energy ranging from about 0.5 $J/cm^2$ to about 50 $J/cm^2$, and the length of each pulse/flash may range from greater than 0 ms to about 50 ms. It is to be understood that the energy may vary, depending upon the metal salt 22, the reaction(s) of the metal salt 22, and the temperature of the reaction(s). In some examples, it may be desirable to perform a series of low energy pulses that will bring the metal salt 22 to a temperature that will dehydrate the metal salt 22, and then another series of higher energy pulses that will bring the dehydrated metal salt 22 to a temperature that will decompose the dehydrated metal salt, and then another series of even higher energy pulses that will bring the decomposed product to a temperature that will reduce the decomposed product to form the metal 22'. In other examples, it may be desirable to perform a series of the same energy pulses that will bring the metal salt 22 to a temperature that will decompose the metal salt 22 to directly to the metal 22'.

In some examples of the method 100, 200, 300, the metallic build material 16 is heated to and maintained at each reaction temperature (e.g., dehydration temperature, decomposition temperature, reduction temperature, etc.) until the reaction is complete, and before the metallic build material 16 is heated to another reaction temperature. It may be desirable to heat and maintain the metallic build material 16 at each reaction temperature until the reaction is complete so that the metal salt 22 is completely thermally decomposed to the metal 22'.

It is to be understood that diffusional mixing of the formed metal 22' with the metallic build material 16 takes place as soon as the metal 22' is formed. As such, the light irradiation sequence used to form the metal 22' may also initiate diffusional mixing. Alternatively, the initial light irradiation may form the metal, and the light irradiation may be adjusted to initiate diffusional mixing. Diffusional mixing takes place at any temperature, and the rate of the mixing may be adjusted by adjusting the temperature. As such, in some examples of the method 100, 200, 300, prior to the application of the additional build material 16, the method further comprises adjusting the light irradiation to initiate diffusional mixing of the metal 22' with the metallic build material 16, to adjust a rate of diffusional mixing of the metal 22' with the metallic build material 16, or combinations thereof. Diffusional mixing is slower at lower temperatures and faster at higher temperatures. As such, if it is desirable to speed up the mixing of the metal 22' with the metallic build material 16, the energy of the light irradiation may be increased to increase the temperature of the metal 22' and the metallic build material 16. Additionally, if it is desirable to achieve more uniform mixing of the metal 22' with the metallic build material 16, the energy of the light irradiation may be applied in multiple pulses/flashes to extend the time for which the metal 22' and the metallic build material 16 are at a desired temperature for diffusional mixing. As an example, the number of flashes/pulses may range from about 1 pulse to about 1000 pulses.

It is to be understood that during the exposing of the patterned build material layer 28 to light irradiation, the metallic build material 16 is maintained below a sintering point of the metallic build material 16. As such, the metallic build material 16 does not prematurely sinter while the metal 22' binder is being formed. As such, the reaction temperature(s) involved in forming the metal 22' from the metal salt 22 and the temperature used to diffusionally mix the metal 22' with the metallic build material 16 may be below the sintering point of the metallic build material 16.

The reaction temperatures (e.g., dehydration temperature, thermal decomposition temperature, reduction temperature, etc.) and the temperature used to diffusionally mix may depend, in part, on the metal salt 22 used and/or the metallic build material 16 used. In an example, the dehydration temperature ranges from about 50° C. to about 200° C. In another example, the decomposition temperature ranges from about 100° C. to about 350° C. In still another example, the reduction temperature ranges from about 200° C. to about 700° C. In yet another example, the temperature used to achieve a faster rate of diffusional mixing ranges from about 300° C. to about 700° C., when the metallic build material 16 is stainless steel. In this example, temperatures higher than 700° C. may cause the non-patterned metallic build material 16 to sinter.

The energy, frequency, and/or the number of pulses in a particular light irradiation sequence may be controlled in order to reach and maintain the reaction temperature(s) for a particular metal salt 22'. The parameters used may depend, in part, on the type of source 26, 26' that is used. For example, with a xenon flash lamp, higher pulse energy may allow a higher temperature to be reached. For another example, with another source 26, 26', repeated pulses at a high frequency may also allow a higher temperature to be reached. For still another example, with a xenon flash lamp, a number of pulses (e.g., from about 10 pulses to about 20 pluses) at a low frequency (e.g., 0.1 Hz) may be used to reach and maintain a temperature for a desirable duration, e.g., the time it takes for a particular reaction to take place.

The temperature may decrease between pulses, and thus the timing of the pulses may be controlled in order to maintain a desired temperature.

The light irradiation may be applied with the source 26 of light irradiation as shown in FIG. 3C or with the source 26' of light irradiation as shown in FIG. 6. In an example of the method 100, 200, 300, the exposing of the metallic build material 16 to light irradiation is accomplished with a xenon flash lamp. This particular example of the source 26, 26' leads to rapid temperature increases and high reaction rates. The source 26, 26' of light irradiation will be discussed further below in reference to the printing system 10 shown in FIG. 6.

In some examples of the method 100, 200, 300, the exposing of the metallic build material 16 to light irradiation is accomplished in an environment containing an inert gas, a reducing gas, or a combination thereof. The exposing of the metallic build material 16 to light irradiation may be accomplished in an environment containing an inert gas and/or a reducing gas so that the metal salt 22, the metal oxide, and/or the metal 22' undergo the intended reaction (e.g., dehydration, thermal decomposition, reduction, etc.) rather than undergoing an alternate reaction which would fail to produce the metal 22' which binds the metallic build material particles 16. Examples of an inert gas include argon gas, helium gas, etc. In some instances, nitrogen gas may also be a suitable inert gas. Examples of a reducing gas include forming gas, hydrogen gas, carbon monoxide gas, etc.

In an example, the metal salt 22 is selected from the group consisting of copper nitrate ($Cu(NO_3)_2$), copper formate ($C_2H_2CuO_4$), copper sulfate ($CuSO_4$), copper oxalate ($CuC_2O_4$), nickel nitrate ($Ni(NO_3)_2$), nickel formate ($C_2H_2NiO_4$), nickel sulfate ($NiSO_4$), nickel oxalate ($NiC_2O_4$), nickel acetate ($Ni(C_2H_3O_2)_2$), nickel thiocyanate ($Ni(SCN)_2$), iron nitrate ($Fe(NO_3)_2$), iron sulfate ($FeSO_4$), iron oxalate ($FeC_2O_4$), iron acetate $Fe(C_2H_3O_2)_2$, manganese nitrate ($Mn(NO_3)_2$), manganese formate ($C_2H_2MnO_4$), manganese oxalate ($MnC_2O_4$), cobalt nitrate ($Co(NO_3)_2$), cobalt formate ($C_2H_2CoO_4$), cobalt sulfate ($CoSO_4$), cobalt oxalate ($CoC_2O_4$), cobalt thiocyanate ($Co(SCN)_2$), chromium nitrate ($Cr(NO_3)_3$), chromium sulfate ($CrSO_4$), magnesium acetate ($Mg(CH_3COO)_2$), magnesium sulfate ($MgSO_4$), neodymium nitrate ($Nd(NO_3)_3$), vanadium sulfate ($VSO_4$), vanadyl sulfate ($VOSO_4$), zirconium nitrate ($Zr(NO_3)_4$), zinc nitrate ($Zn(NO_3)_2$), zinc sulfate ($ZnSO_4$), silver nitrate ($Ag(NO_3)_2$), yttrium nitrate ($Y(NO_3)_3$) and combinations thereof, and the exposing of the metallic build material 16 to light irradiation is accomplished in an environment containing an inert gas. In another example, any of the previously listed metal salts 22 may be used, and the exposing of the metallic build material 16 to light irradiation is accomplished in an environment containing a reducing gas.

The processes shown in FIG. 1, at reference numerals 202 through 206 in FIG. 2, and FIGS. 3A through 3C may be repeated to iteratively build up several intermediate part layers to form the intermediate part 40. FIG. 2, at reference numeral 208, shows that the method 200 includes repeating the applying of the metallic build material 16, the selectively applying of the patterning fluid 20, and the exposing of the metallic build material 16 to the light irradiation. Following the formation of the metal 22' which binds the predetermined portion(s) 30 of the build material layer 28, the controller 50 may process data, and in response cause the build area platform 12 to be moved a relatively small distance in the downward direction denoted by the bi-directional arrow 34. In other words, the build area platform 12 may be lowered to enable the next layer of metallic build material 16 to be applied. For example, the build area platform 12 may be lowered a distance that is equivalent to the height of the build material layer 28. In addition, following the lowering of the build area platform 12, the controller 50 may control the build material supply 14 to supply additional build material 16 (e.g., through operation of an elevator, an auger, or the like) and the build material distributor 18 to form another build material layer on top of the previously formed intermediate part layer with the additional build material 16. The newly formed build material layer may be patterned with the patterning fluid 20, and then exposed to light irradiation from the source 26, 26' of light irradiation to form the additional intermediate part layer.

Figure 3D:
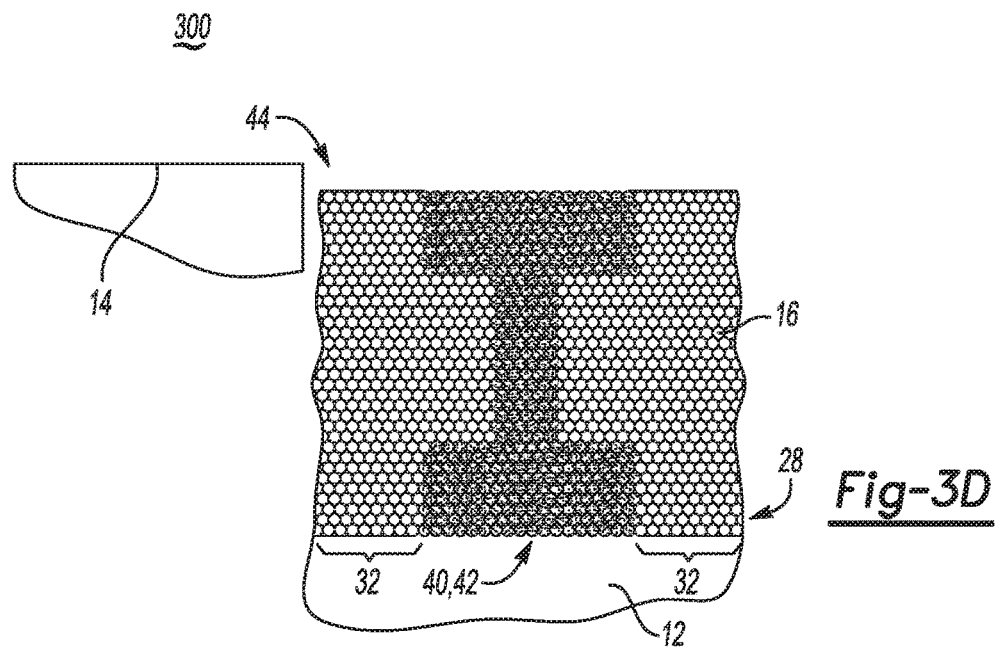

Repeatedly forming, patterning, and exposing new layers results in the formation of a build material cake 44, as shown in FIG. 3D, which includes the intermediate part 40 residing within the non-patterned portions 32 of each of the build material layers. The intermediate part 40 is a volume of the build material cake 44 that is filled with metallic build material particles 16 bound by the metal 22'. The remainder of the build material cake 44 is made up of unbound metallic build material particles 16.

In some examples of the method 100, 200, 300, after the metal 22' has been formed and prior to building another layer, the intermediate part layer may be exposed to additional light irradiation. In these examples, the patterned build material 16 that is bound by the metal 22' is exposed to additional light irradiation that is sufficient to sinter the metallic build material 16 in the at least the portion 30. Since the metal 22' may increase light absorption within the portion 30 and/or may increase the solid state diffusion between the patterned metallic build material 16, the additional light irradiation may cause the build material 16 in the patterned portion 30 to sinter, while the non-patterned build material 16 in the non-patterned portions 32 remain non-sintered. In these examples of the method 100, 200, 300, the repeating includes repeating the applying of the metallic build material 16, the selectively applying of the patterning fluid 20, and the exposing of the metallic build material 16 to the light irradiation and the additional light irradiation. This process forms a final part layer that includes sintered build material particles with the metal 22' intermingled therein.

Repeatedly forming, patterning, and exposing to the light irradiation and the additional light irradiation results in the formation of a build material cake 44, as shown in FIG. 3D, which includes the final part 42 residing within the non-patterned portions 32 of each of the build material layers. The final part 42 is a volume of the build material cake 44 that is a continuous body of sintered metallic build material particles intermingled with the metal 22'. The remainder of the build material cake 44 is made up of unbound metallic build material particles 16.

In any of the examples disclosed herein, prior to performing any light irradiation, the non-patterned portions 32 of each of the build material layers may have a detailing agent applied thereon. It may be desirable to selectively deposit the detailing agent on the portion(s) 32 in order to reduce the light absorption of the build material 16 in the non-patterned portions 32. This helps to keep the build material particles 16 in the portion(s) 32 from sintering. An example of the detailing agent may be an inkjettable water or solvent based formulation including a reflective material, such as, titanium dioxide ($TiO_2$) nanoparticles.

Figure 3E:
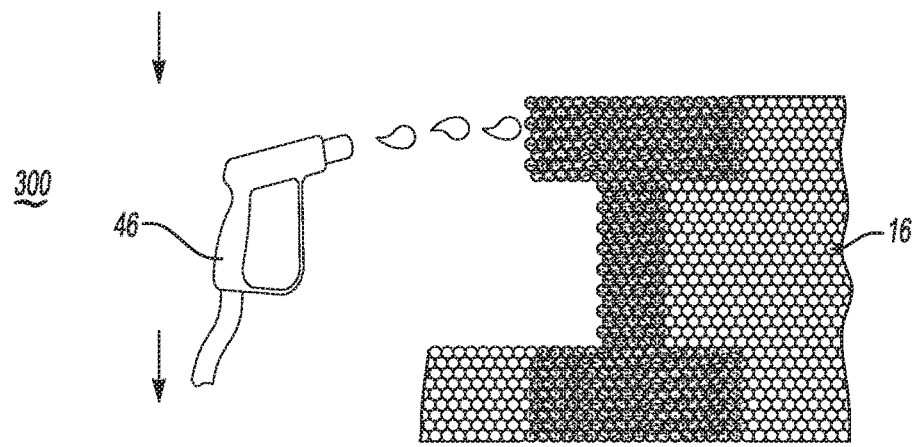

As shown in FIG. 3E, the method 100, 200, 300 may continue by extracting the intermediate part 40 or final part 42 from the build material cake 44. The part 40, 42 may be extracted by any suitable means. In an example, the part 40, 42 may be extracted by lifting the part 40, 42 from the non-patterned metallic build material particles 16. An extraction tool may be used. In another example, the part 40, 42 may be extracted using a wet or a dry extraction process. In the example shown in FIG. 3E, the wet extraction process is used to extract the part 40, 42. In an example, the wet extraction process may include spraying the build material cake 44 with water using wet extraction tool(s) 46, such as a hose and a sprayer, a spray gun, etc. In other examples, the wet extraction process may include sonicating the build material cake 44 in a water bath or soaking the build material cake 44 in water. In some examples, dry extraction of non-patterned metallic particles 16 from the build material cake 44 may be used in place of wet extraction. As an example, non-patterned metallic particles 16 from the build material cake 44 may be removed by suction from a vacuum hose and collection in a reservoir for future use. Metallic build material particles 16 from non-patterned regions (e.g., 32 in FIG. 3B) that remain bound to the intermediate part 40 or the final part 42 may be removed by light bead blasting or cleaning with a brush and/or an air jet.

After extraction from the build material cake 44 and/or the cleaning of the final part 42, the final part 42 may be used for its intended or desired purpose without any further processing.

Figure 3F:
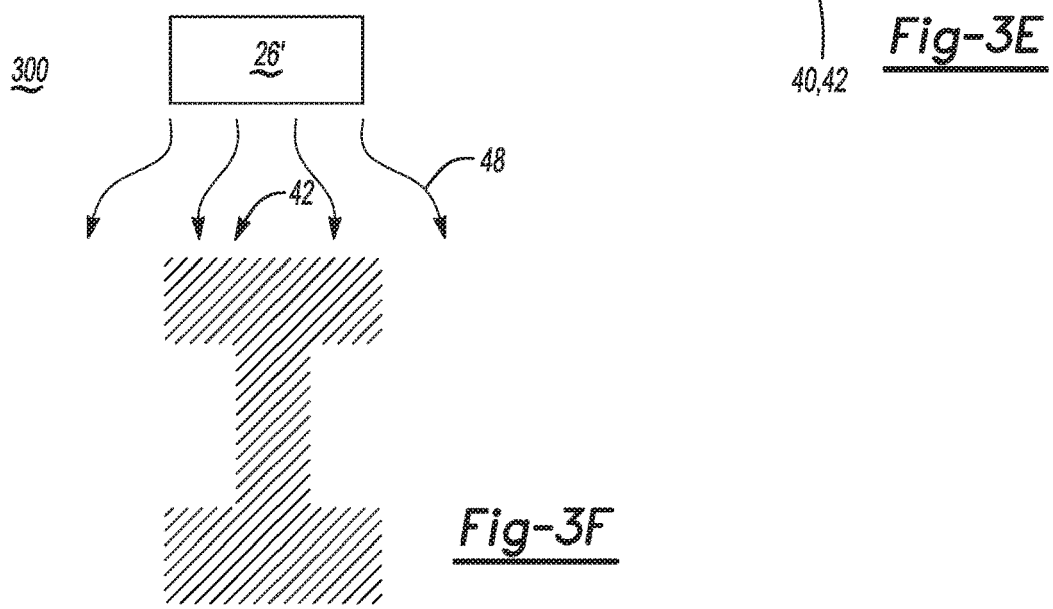

After the extraction from the build material cake 44 and/or the cleaning of the intermediate part 40, the intermediate part 40 may be heated to a sintering temperature to sinter the metallic build material particle 16 and form the final part 42. Heating, as denoted by the arrows 48, to the sintering temperature to form the final part 42 is shown in FIG. 3F.

Heating to sinter is accomplished at a sintering temperature that is sufficient to sinter the remaining metallic build material particles 16. The sintering temperature is highly dependent upon the composition of the metallic build material 16. During heating/sintering, the intermediate part 40 may be heated to a sintering temperature ranging from about 80% to about 99.9% of the melting point or the solidus, eutectic, or peritectic temperature of the metallic build material 16. In another example, the intermediate part 40 may be heated to a sintering temperature ranging from about 90% to about 95% of the melting point or the solidus, eutectic, or peritectic temperature of the metallic build material 16. In still another example, the intermediate part 40 may be heated to a sintering temperature ranging from about 60% to about 90% of the melting point or the solidus, eutectic, or peritectic temperature of the metallic build material 16. In yet another example, the sintering temperature may range from about 10° C. below the melting temperature (e.g., the solidus temperature) of the metallic build material 16 to about 50° C. below the melting temperature of the metallic build material 16. In yet another example, the sintering temperature may range from about 100° C. below the melting temperature (e.g., the solidus temperature) of the metallic build material 16 to about 200° C. below the melting temperature of the metallic build material 16.

The sintering temperature may also depend upon the particle size and time for sintering (i.e., high temperature exposure time). As an example, the sintering temperature may range from about 450° C. to about 1800° C. In another example, the sintering temperature is at least 900° C. An example of a sintering temperature for bronze is about 850° C., and an example of a sintering temperature for stainless steel ranges from about 1000° C. to about 1450° C., and an example of a sintering temperature for aluminum alloys ranges from about 450° C. to about 600° C. While these temperatures are provided as sintering temperature examples, it is to be understood that the sintering temperature depends upon the metallic build material particles 16 that are utilized, and may be higher or lower than the provided examples.

Heating at a suitable temperature sinters the metallic build material particles 16 to form the final part 42, which may be densified relative to the intermediate part 40. For example, as a result of sintering, the density may go from 50% density to over 90%, and in some cases very close to 100% of the theoretical density.

The length of time for which the heat (for sintering) is applied and the rate at which the intermediate part 40 is heated may be dependent, for example, on one or more of: characteristics of the heat source, characteristics of the metallic build material 16 (e.g., type, particle size, etc.), and/or the characteristics of the part 40, 42 (e.g., wall thickness). In an example, the intermediate part 40 may be heated at the sintering temperature for a sintering time period ranging from about 1 hour to about 24 hours. The intermediate part 40 may be heated to the sintering temperature at a rate ranging from about 1° C./minute to about 20° C./minute. A high ramp rate up to the sintering temperature may be desirable to produce a more favorable grain structure or microstructure. However, in some instances, slower ramp rates may be desirable.

In some examples of the method 100, 200, 300, the heating of the intermediate part 40 to form the final part 42 is accomplished in an environment containing an inert gas, a reducing gas, or a combination thereof. Sintering may be accomplished in an environment containing an inert gas, and/or a reducing gas so that the metallic build material particles 16 will sinter rather than undergoing an alternate reaction (e.g., an oxidation reaction) which would fail to produce the final part 42, and/or so that any remaining metal salt 22 or decomposition product thereof is fully reduced to the metal 22'.

In one example, of the method 100, 200, 300, the heating of the intermediate part 40 to form the final part 42 is accomplished within a time period ranging from about 1 hour to about 24 hours and within an environment that contains an inert gas or a reducing gas.

Figure 5:
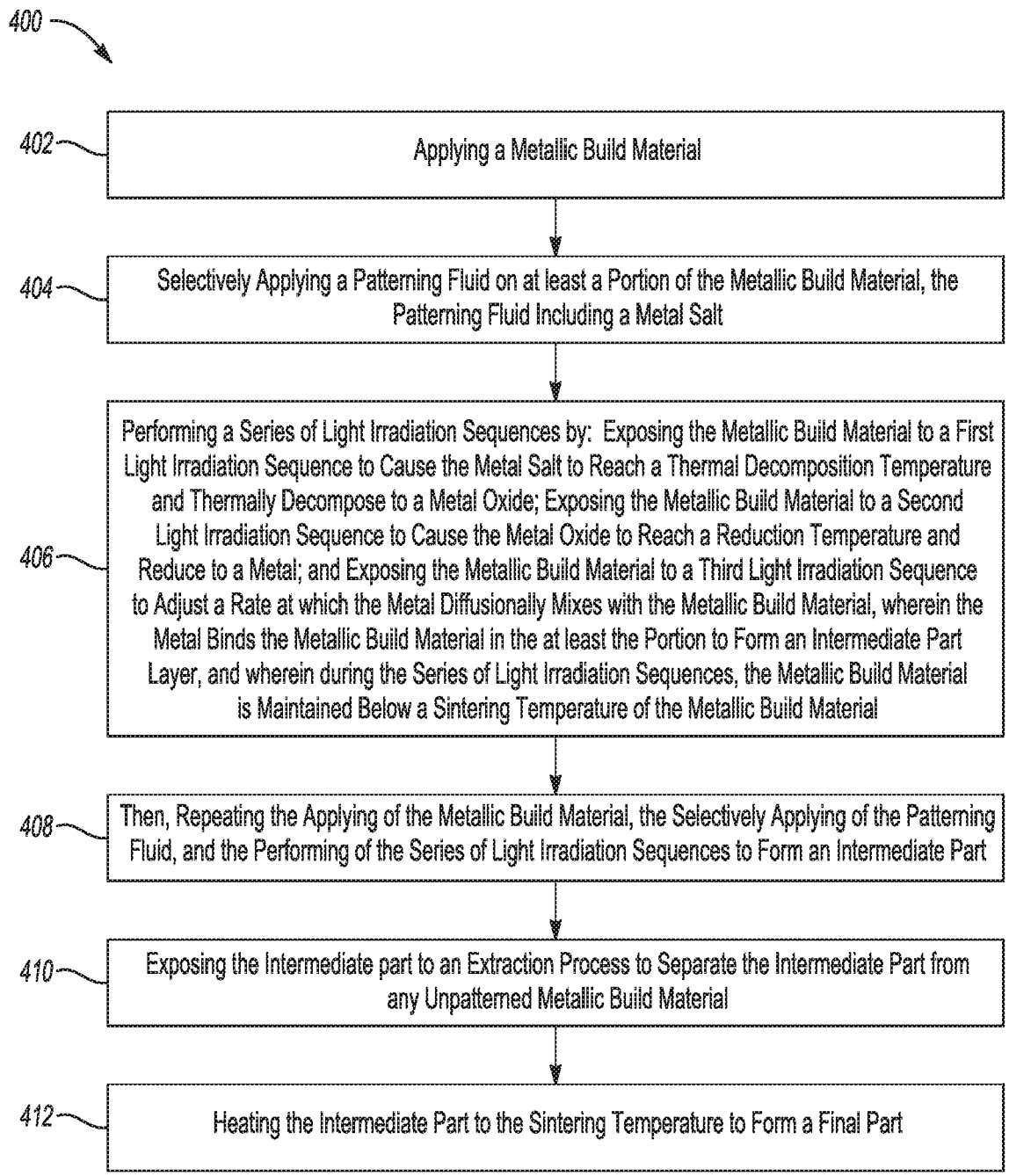
FIG. 5 a flow diagram illustrating another example of a method for 3D printing disclosed herein.

As shown in FIG. 5, one example of the three-dimensional (3D) printing method 400, comprises: applying a metallic build material 16 (reference numeral 402); selectively applying a patterning fluid 20 on at least a portion 30 of the metallic build material 16, the patterning fluid 20 including a metal salt 22 (reference numeral 404); performing a series of light irradiation sequences by: exposing the metallic build material 16 to a first light irradiation to cause the metal salt 22 to reach a thermal decomposition temperature and thermally decompose to a metal oxide; exposing the metallic build material 16 to a second light irradiation sequence to cause the metal oxide to reach a reduction temperature and reduce to a metal 22'; and exposing the metallic build material 16 to a third light irradiation sequence to adjust a rate at which the metal 22' diffusionally mixes with the metallic build material 16, wherein the metal 22' binds the metallic build material 16 in the at least portion 30 to form an intermediate part layer (reference numeral 406), and wherein during the series of light irradiation sequences, the metallic build material 16 is maintained below a sintering temperature of the metallic build material 16; then, repeating the applying of the metallic build material 16, the selectively applying of the patterning fluid 20, and the performing of the series of light irradiation sequences to form an intermediate part 40 (reference numeral 408); exposing the intermediate part 40 to an extraction process to separate the intermediate part 40 from any non-patterned metallic build material 16 (reference numeral 410); and heating the intermediate part 40 to a sintering temperature to form a final part 42 (reference numeral 412).

Referring now to FIG. 6, an example of a 3D printing system 10 is schematically depicted. It is to be understood that the 3D printing system 10 may include additional components (some of which are described herein) and that some of the components described herein may be removed and/or modified. Furthermore, components of the 3D printing system 10 depicted in FIG. 6 may not be drawn to scale and thus, the 3D printing system 10 may have a different size and/or configuration other than as shown therein.

In an example, the three-dimensional (3D) printing system 10, comprises: a supply 14 of metallic build material 16; a build material distributor 18; a supply of a patterning fluid 20 including a metal salt 22; an applicator 24 for selectively dispensing the patterning fluid 20; a source 26, 26' of light irradiation; a controller 50; and a non-transitory computer readable medium having stored thereon computer executable instructions to cause the controller 50 to: utilize the build material distributor 18 to dispense the metallic build material 16; utilize the applicator 24 to selectively dispense the patterning fluid 20 on at least a portion 30 of the metallic build material 16; and utilize the source 26, 26' of light irradiation to, prior to an application of additional build material 16, expose the metallic build material 16 to light irradiation to cause the metal salt 22 to reach a thermal decomposition temperature and thermally decompose to a metal 22', wherein during the exposing, the metallic build material 16 is maintained below its sintering temperature.

As shown in FIG. 6, the printing system 10 includes the build area platform 12, the build material supply 14 containing the metallic build material 16, and the build material distributor 18.

As mentioned above, the build area platform 12 receives the metallic build material 16 from the build material supply 14. The build area platform 12 may be integrated with the printing system 10 or may be a component that is separately insertable into the printing system 10. For example, the build area platform 12 may be a module that is available separately from the printing system 10. The build area platform 12 that is shown is one example, and could be replaced with another support member, such as a platen, a fabrication/print bed, a glass plate, or another build surface.

As also mentioned above, the build material supply 14 may be a container, bed, or other surface that is to position the metallic build material 16 between the build material distributor 18 and the build area platform 12. In some examples, the build material supply 14 may include a surface upon which the metallic build material 16 may be supplied, for instance, from a build material source (not shown) located above the build material supply 14. Examples of the build material source may include a hopper, an auger conveyer, or the like. Additionally, or alternatively, the build material supply 14 may include a mechanism (e.g., a delivery piston) to provide, e.g., move, the metallic build material 16 from a storage location to a position to be spread onto the build area platform 12 or onto a previously formed layer of the intermediate part 40 or the final part 42.

As also mentioned above, the build material distributor 18 may be a blade (e.g., a doctor blade), a roller, a combination of a roller and a blade, and/or any other device capable of spreading the metallic build material 16 over the build area platform 12 (e.g., a counter-rotating roller).

In some examples, the build material supply 14 or a portion of the build material supply 14 may translate along with the build material distributor 18 such that build material 16 is delivered continuously to the material distributor 18 rather than being supplied from a single location at the side of the printing system 10 as depicted in FIG. 6.

As shown in FIG. 6, the printing system 10 also includes the applicator 24, which may contain the patterning fluid 20. The applicator 24 may be scanned across the build area platform 12 in the direction indicated by the arrow 28, e.g., along the y-axis. The applicator 24 may be, for instance, a thermal inkjet printhead, a piezoelectric printhead, a continuous inkjet printhead, etc., and may extend a width of the build area platform 12. While the applicator 24 is shown in FIG. 6 as a single applicator, it is to be understood that the applicator 24 may include multiple applicators that span the width of the build area platform 12. Additionally, the applicators 24 may be positioned in multiple printbars. The applicator 24 may also be scanned along the x-axis, for instance, in configurations in which the applicator 24 does not span the width of the build area platform 12 to enable the applicator 24 to deposit the patterning fluid 20 over a large area of the build material layer 28. The applicator 24 may thus be attached to a moving XY stage or a translational carriage 54 that moves the applicator 24 adjacent to the build area platform 12 in order to deposit the patterning fluid 20 in predetermined areas 30 of the build material layer 28 that has been formed on the build area platform 12 in accordance with the method 100, 200, 300, 400 disclosed herein. The applicator 24 may include a plurality of nozzles (not shown) through which the patterning fluid 20 is to be ejected.

The applicator 24 may deliver drops of the patterning fluid 20 at a resolution ranging from about 300 dots per inch (DPI) to about 1200 DPI. In other examples, the applicator 24 may deliver drops of the patterning fluid 20 at a higher or lower resolution. The drop velocity may range from about 5 m/s to about 24 m/s and the firing frequency may range from about 1 kHz to about 100 kHz. In one example, the volume of each drop may be in the order of about 3 picoliters (pl) to about 18 pl, although it is contemplated that a higher or lower drop volume may be used. For example, drop volume may range from about 10 pl to about 40 pl. In some examples, the applicator 24 is able to deliver variable drop volumes of the patterning fluid 20. One example of a suitable printhead has 600 DPI resolution and can deliver drop volumes ranging from about 6 pl to about 14 pl.

Each of the previously described physical elements may be operatively connected to a controller 50 of the printing system 10. The controller 50 may process print data that is based on a 3D object model of the 3D object/part to be generated. In response to data processing, the controller 50 may control the operations of the build area platform 12, the build material supply 14, the build material distributor 18, and the applicator 24. As an example, the controller 50 may control actuators (not shown) to control various operations of the 3D printing system 10 components. The controller 50 may be a computing device, a semiconductor-based microprocessor, a central processing unit (CPU), an application specific integrated circuit (ASIC), and/or another hardware device. Although not shown, the controller 50 may be connected to the 3D printing system 10 components via communication lines.

The controller 50 manipulates and transforms data, which may be represented as physical (electronic) quantities within the printer's registers and memories, in order to control the physical elements to create the 3D part. As such, the controller 50 is depicted as being in communication with a data store 52. The data store 52 may include data pertaining to a 3D part to be printed by the 3D printing system 10. The data for the selective delivery of the metallic build material 16, the patterning fluid 20, etc. may be derived from a model of the 3D part to be formed. For instance, the data may include the locations on each build material layer that the applicator 24 is to deposit the patterning fluid 20. In one example, the controller 50 may use the data to control the applicator 24 to selectively apply the patterning fluid 20. The data store 52 may also include machine readable instructions (stored on a non-transitory computer readable medium) that are to cause the controller 50 to control the amount of metallic build material 16 that is supplied by the build material supply 14, the movement of the build area platform 12, the movement of the build material distributor 18, the movement of the applicator 24, etc.

As shown in FIG. 6, the printing system 10 may also include a source 26, 26' of light irradiation. In some examples, the source 26' of light irradiation may be in a fixed position with respect to the build area platform 12. In other examples, the source 26 of light irradiation may be positioned to apply light irradiation to the build material layer 28 immediately after the patterning fluid 20 has been applied thereto. In the example shown in FIG. 6, the source 26 of light irradiation is attached to the side of the applicator 24 which allows for patterning and exposing to light irradiation in a single pass.

The source 26, 26' of light irradiation may emit pulses/flashes of light irradiation. In an example, each pulse/flash may emit light irradiation having an energy ranging from about 0.5 J/cm$^2$ to about 50 J/cm$^2$, and the length of each pulse/flash may range from greater than 0 (e.g., 10 μs) to about 50 ms. In some examples, the length of each pulse/flash may range from greater than 0 ms to about 10 ms. Examples of the source 26, 26' of light irradiation may include gas discharge lamps capable of producing high energy light pulses, electric arc lamps, arrays of lasers, and/or arrays of high power light emitting diodes. In a specific example, the source 26, 26' of light irradiation may be a xenon discharge lamp, a noble gas flash lamp, a mercury vapor lamp, a metal halide lamp, or a sodium vapor lamp. In another specific example, the source 26, 26' of light irradiation is a xenon strobe lamp (e.g., an industrial grade xenon strobe lamp).

The source 26, 26' of light irradiation may be operatively connected to a source driver, an input/output temperature controller, and temperature and/or energy sensors, which are collectively shown as light irradiation system components 56. The light irradiation system components 56 may operate together to control the source 26, 26' of light irradiation. The temperature recipe (e.g., radiation exposure rate) may be submitted to the input/output temperature controller, and the temperature recipe may depend upon the chemical reaction(s) of the metal salt 22 that is being used. The temperature recipe may be pre-programmed and based on light intensity/temperature calibration data. During heating, the temperature sensors may sense the temperature of the metallic build material 16, and the temperature measurements may be transmitted to the input/output temperature controller. For example, a thermometer (e.g., a thermocouple) associated with the heated area can provide temperature feedback, which may indicate the progress of the metal salt 22 in forming the metal 22'. For another example, a bolometer associated with the heated area can provide feedback related to the power of incident radiation and to a corresponding temperature change, which may indicate the progress of the metal salt 22 in forming the metal 22'. The input/output temperature controller may adjust the source 26, 26' of light irradiation power set points based on any difference between the recipe and the real-time measurements. These power set points are sent to the lamp/source drivers, which transmit appropriate voltages to the source 26, 26' of light irradiation. This is one example of the light irradiation system components 56, and it is to be understood that other light irradiation source control systems may be used. For example, the controller 50 may be configured to control the source 26, 26' of light irradiation.

To further illustrate the present disclosure, examples are given herein. It is to be understood that these examples are provided for illustrative purposes and are not to be construed as limiting the scope of the present disclosure.

EXAMPLES

Example 1

An example of the patterning fluid was prepared. The example patterning fluid included a water-based vehicle (also including a co-solvent and surfactants) and a 40 wt % loading of copper nitrate trihydrate. Test specimens (referred to as the "first specimen" and the "second specimen") were fabricated by depositing the example patterning fluid on a quartz slide. Then, a commercial xenon strobe lamp was used to expose each specimen to light irradiation. The xenon strobe lamp was capable of delivering between about 0.5 J/cm$^2$ to about 50 J/cm$^2$ in a single pulse/flash lasting up to about 10 ms, and the pulse/flash energy could be varied with an accuracy better than about 0.1 J/cm$^2$.

The first specimen was exposed to the light irradiation in an argon gas ambient (i.e., an environment containing the inert gas). The first specimen in the argon gas ambient was exposed to a series of light irradiation sequences including (i) 5 pulses/flashes at 3.82 J/cm$^2$; (ii) 5 pulses/flashes at 5.64 J/cm$^2$; (iii) 5 pulses/flashes at 5.64 J/cm$^2$; (iv) 5 pulses/flashes at 8.57 J/cm$^2$; and (v) 5 pulses/flashes at 13.9 J/cm$^2$.

Figure 7A:
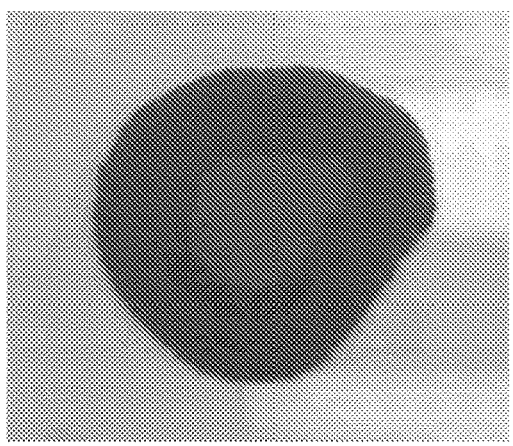
FIGS. 7A through 7C are black and white reproductions of originally colored photographs showing an example of a patterning fluid disclosed herein, at different stages of a series of light irradiation sequences in an inert gas environment.
Figure 7B:
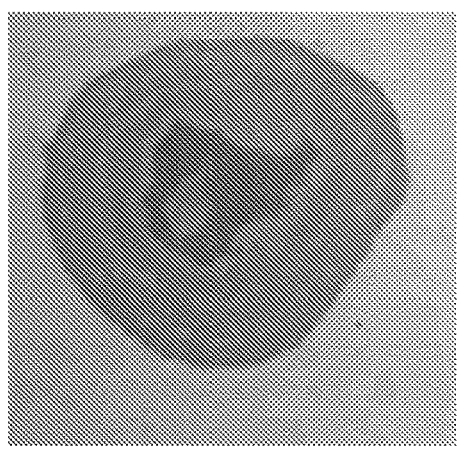
Figure 7C:
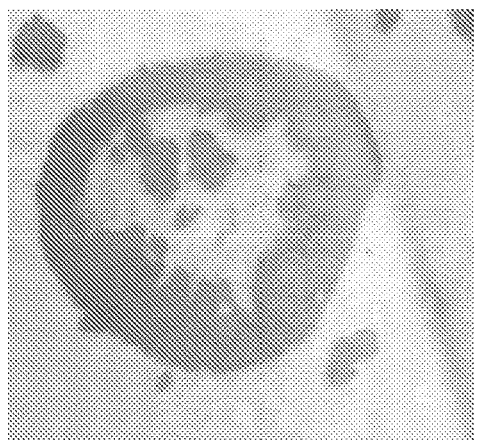

The argon gas ambient allowed the copper nitrate to thermally decompose to cupric oxide, but did not allow for the reduction of cupric oxide to copper. FIGS. 7A through 7C show, in black and white, the first specimen at different stages of the series of light irradiation sequences. FIG. 7A depicts the first specimen after the example patterning fluid was applied and before it was exposed to the series of light irradiation sequences. FIG. 7A shows the copper nitrate (denoted, in the original photograph, by the blue color). FIG. 7B depicts the first specimen after it was exposed to the pulses/flashes in sequence (ii) and before it was exposed to the pulses/flashes in sequence (iii). FIG. 7B shows that the copper nitrate had started to thermally decompose to cupric oxide (denoted, in the original photograph, by the black color in the center surrounded by the blue color of the remaining copper nitrate). FIG. 7C depicts the first specimen after it was exposed to the entire series of light irradiation sequences. FIG. 7C shows that copper nitrate had completely thermally decomposed to cupric oxide (denoted, in the original photograph, by the black color around the edges), but also indicates that in the inert environment, the cupric oxide evaporates rather than reducing to copper (denoted by the absence of cupric oxide and copper in the center).

The second specimen was exposed to the light irradiation in a forming gas (96 wt % $N_2$ and 4 wt % $H_2$) ambient (i.e., an environment containing a combination of an inert gas and a reducing gas). The second specimen in the forming gas ambient was exposed to a series of light irradiation sequences including (i) 5 pulses/flashes at 3.82 $J/cm^2$; (ii) 5 pulses/flashes at 5.64 $J/cm^2$; (iii) 5 pulses/flashes at 10.57 $J/cm^2$; (iv) 5 pulses/flashes at 13.9 $J/cm^2$; and (v) 5 pulses/flashes at 22.0 $J/cm^2$.

Figure 8A:
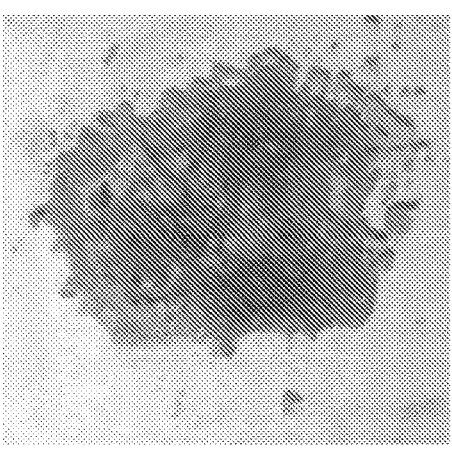
FIGS. 8A through 8C are black and white reproductions of originally colored photographs showing the example of a patterning fluid, at different stages of a series of light irradiation sequences in a reducing gas environment.
Figure 8B:
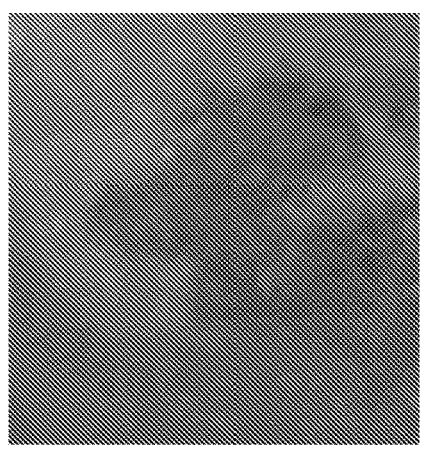
Figure 8C:
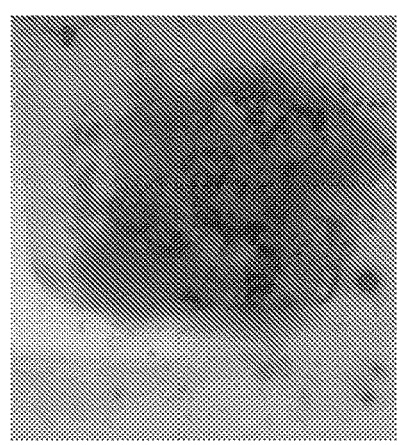

The forming gas ambient allowed the copper nitrate to thermally decompose (and reduce) to copper. FIGS. 8A through 8C show the second specimen at different stages of the series of light irradiation sequences. FIG. 8A depicts the second specimen after the example patterning fluid was applied and before it was exposed to the series of light irradiation sequences. FIG. 8A shows the copper nitrate (denoted, in the original photograph, by the blue color). FIG. 8B depicts the second specimen after it was exposed to the pulses/flashes in sequence (ii) and before it was exposed to the pulses/flashes in sequence (iii). FIG. 8B shows that the copper nitrate had started to thermally decompose to cupric oxide (denoted, in the original photograph, by the black color of the second specimen with very little the blue color of the copper nitrate remaining). FIG. 8C depicts the second specimen after it was exposed to the pulses/flashes in sequence (iv) and before it was exposed to the pulses/flashes in sequence (v). FIG. 8C shows that copper nitrate had completely thermally decomposed to cupric oxide (denoted, in the original photograph, by the black color remaining), and that the cupric oxide, in the presence of the forming gas, had reduced to copper (denoted, in the original photograph, by the copper amber color). After the second specimen was exposed to the pulses/flashes in sequence (v), the copper was mostly evaporated.

Example 2

Figure 9A:
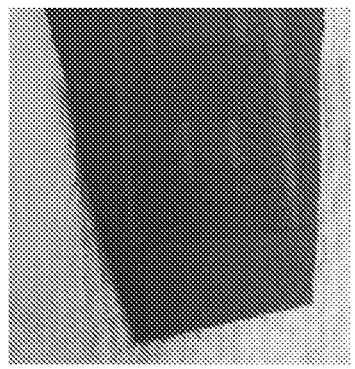
FIGS. 9A through 9D are black and white reproductions of originally colored photographs showing examples of a patterned build material layer before (9A and 9C) and after (9B and 9D) two different light irradiation sequences were performed.

A TIPS pen, capable of depositing about 0.00194 liters of fluid per square meter or about 0.025 grams of the example patterning fluid per square meter, was used to pattern two different samples of 200 micron thick layers of stainless steel powder on a quartz substrate, hereby referred to as sample 1 and sample 2. The stainless steel powder had an average particle size of about 40 μm. 5 passes of the pen were used to deposit about 0.125 grams of the example patterning fluid (described in Example 1) per square meter. The patterned layers of sample 1 are shown in FIG. 9A and the patterned layers of sample 2 are shown in FIG. 9C (both in black and white).

Then, the xenon strobe lamp was used to expose each sample to light irradiation.

Sample 1 was exposed to a series of light irradiations in a forming gas (96 wt % $N_2$ and 4 wt % $H_2$) ambient that included low energy flashes (10 pulses/flashes at 3.82 $J/cm^2$) followed by high energy flashes (10 pulses/flashes at 22.0 $J/cm^2$) corresponding to heating the sample to a low temperature followed by a high temperature and omitting the intermediate temperature range in which transformation of Cu nitride into Cu oxide occurs.

Sample 2 was exposed to the light irradiation in a forming gas (96 wt % $N_2$ and 4 wt % $H_2$) ambient. The series of light irradiation sequences consisted of: (i) 10 pulses/flashes at 3.82 $J/cm^2$; followed by (ii) 10 pulses/flashes at 5.64 $J/cm^2$; followed by (iii) 10 pulses/flashes at 7.89 $J/cm^2$; followed by (iv) 10 pulses/flashes at 13.9 $J/cm^2$ and followed by (v) 10 pulses/flashes at 22.0 $J/cm^2$. This flash heating sequence corresponded to a low temperature at which dehydration occurs, followed by flash heating to an intermediate temperature at which dehydrated Cu nitride is transformed into Cu oxide, followed by high temperature flash heating at which Cu oxide is reduced to Cu.

Figure 9B:
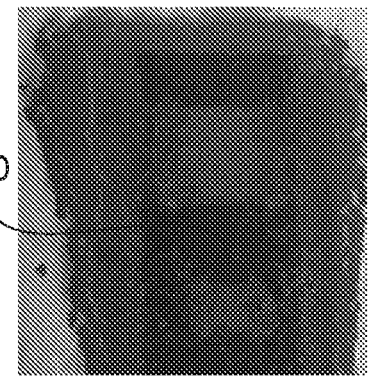
Figure 9C:
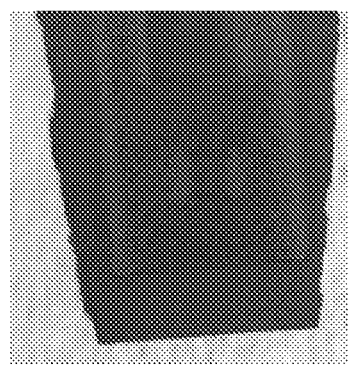
Figure 9D:
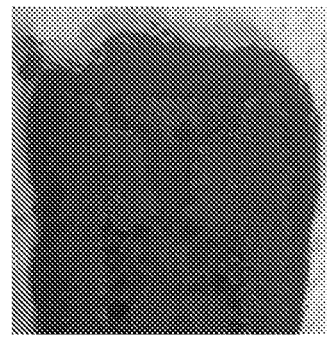

Samples 1 and 2 after exposure to the respective light irradiation sequences are respectively shown in FIG. 9B (sample 1) and FIG. 9D (sample 2). There was less of the black color, which is copper oxide, in sample 2 (FIG. 9D) than in sample 1 (FIG. 9B) after light irradiation. These results indicated that the entire sequence of flash heating including low temperature flash heating, follow by medium temperature flash heating, followed by high temperature flash heating is more effective to achieve complete transformation of hydrated copper salt into copper.

Example 3

Figure 10A:
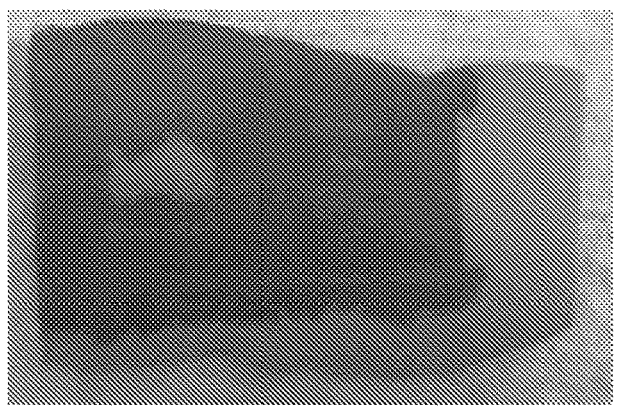
FIGS. 10A through 10D are black and white reproductions of originally colored photographs showing other examples of a patterned build material layer before (10A and 10C) and after (10B and 10D) two different light irradiation sequences were performed.

The TIPS pen was used to pattern two different samples of layers of copper powder (referred to as sample 3 and sample 4). The copper powder had an average particle size of about 40 μm. Each layer of the copper powder was about 200 μm thick and was spread on a quartz slide. 5 passes of the pen were used to deposit about 0.125 grams of the example patterning fluid (described in Example 1) per square meter. The patterned layers of sample 3 are shown in FIG. 10A and the patterned layers of sample 4 are shown in FIG. 10C (both in black and white) before any light irradiation sequence was performed.

Then, the xenon strobe lamp was used to expose each sample to light irradiation.

Sample 3 was exposed to the light irradiation in a forming gas (96 wt % $N_2$ and 4 wt % $H_2$) ambient consisting of a series of light irradiation sequences including (i) 10 pulses/flashes at 3.82 $J/cm^2$; followed by (ii) 10 pulses/flashes at 5.64 $J/cm^2$; followed by (iii) 10 pulses/flashes at 7.89 $J/cm^2$; and followed by (iv) 10 pulses/flashes at 10.8 $J/cm^2$.

Sample 4 was exposed to the light irradiation in a forming gas (96 wt % $N_2$ and 4 wt % $H_2$) ambient consisting of a series of light irradiation sequences including (i) 20 pulses/flashes at 3.82 $J/cm^2$; followed by (ii) 20 pulses/flashes at 5.64 $J/cm^2$; (iii) followed by 20 pulses/flashes at 7.89 $J/cm^2$; and followed by (iv) 10 pulses/flashes at 10.8 $J/cm^2$.

Figure 10B:
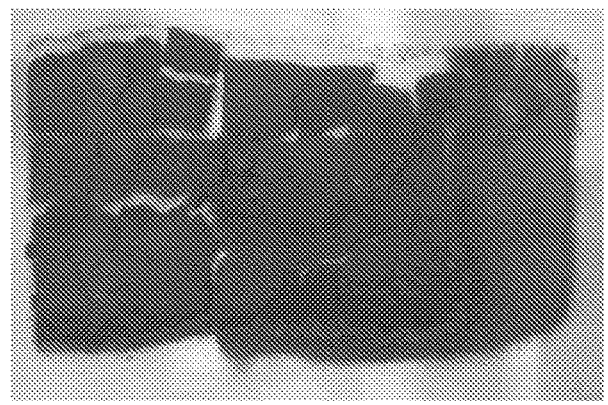
Figure 10C:
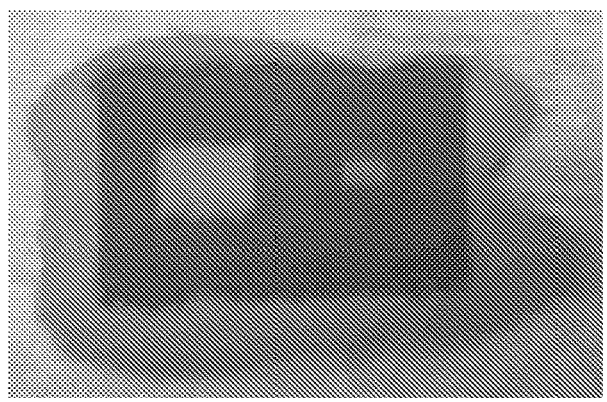
Figure 10D:
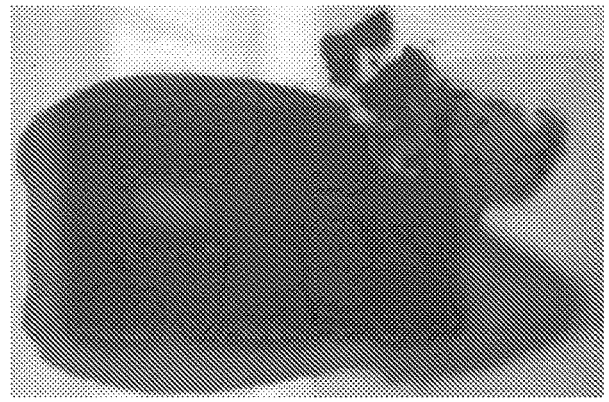

Samples 3 and 4, after exposure to the respective light irradiation sequences, are shown in FIG. 10B (sample 3) and FIG. 10D (sample 4). Doubling the number of pulses/flashes in three of the four light irradiation sequences provided a more complete reduction process and less visible black cupric oxide (compare FIG. 10D with FIG. 10B). It is believed that doubling the number of pulses/flashes in most of the light irradiation sequence allowed each reaction to be completed before the temperature of the layer was raised to the next reaction temperature. As shown in FIG. 10D, the patterned portions of sample 4 were well bonded after exposure to the series of light irradiation sequences. The bonded portions could be lifted from the quartz slide and manipulated without losing their shape. The non-patterned copper powder was not affected by the series of light irradiation sequences.

It is to be understood that the ranges provided herein include the stated range and any value or sub-range within the stated range. For example, from about 1 hour to about 24 hours should be interpreted to include not only the explicitly recited limits of from about 1 hour to about 24 hours, but also to include individual values, such as about 8 hours, about 13.1 hours, about 22 hours, about 17.85 hours, about 19.5 hours, etc., and sub-ranges, such as from about 8.5 hours to about 20.5 hours, from about 1.5 hours to about 23 hours, from about 15 hours to about 21 hours, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A three-dimensional (3D) printing method, applying a layer of a metallic build material;
   selectively applying a patterning fluid on at least a portion of the metallic build material, the patterning fluid including a metal salt; and
   prior to an application of additional build material, exposing the layer of the metallic build material to a series of pulses of light irradiation that increase in energy, via a lamp, to cause the metal salt to reach a thermal decomposition temperature and thermally decompose to a metal while the build material is maintained below a sintering temperature of the metallic build material;
   after exposing the layer of the metallic build material to the light irradiation, applying an other layer of the metallic build material;
   selectively applying additional patterning fluid on at least a portion of the other layer of metallic build material; and
   exposing the other layer to another series of pulses of light irradiation that increase in energy, via the lamp, to cause the metal salt in the additional patterning fluid to reach the thermal decomposition temperature and thermally decompose to the metal while the build material is maintained below the sintering temperature of the metallic build material.

2. The method as defined in claim 1 wherein the metal salt thermally decomposing includes a series of chemical reactions, each occurring at a respective reaction temperature, and wherein the method further comprises adjusting energy of the light irradiation to achieve the respective reaction temperatures associated with each of the chemical reactions.

3. The method as defined in claim 1 wherein the metal salt thermally decomposing to the metal includes:
   a thermal decomposition reaction generating a metal oxide; and
   a reduction reaction to reduce the metal oxide and generate the metal.

4. The method as defined in claim 1 further comprising, prior to applying the other layer, adjusting the series of pulses of light irradiation to: initiate diffusional mixing of the metal with the metallic build material, to adjust a rate of diffusional mixing of the metal with the metallic build material, or combinations thereof.

5. The method as defined in claim 1, wherein the metal salt is a hydrated metal salt, and wherein the method comprises, exposing the layer of the metallic build material to the series of pulses of light irradiation to cause the hydrated metal salt to reach a dehydration temperature and dehydrate to a dehydrated metal salt prior to reaching the thermal decomposition temperature.

6. The method as defined in claim 1 wherein the layer of the metallic build material is exposed to the series of pulses of light irradiation in an environment containing an inert gas, a reducing gas, or a combination thereof.

7. The method as defined in claim 1 wherein the metal salt is selected from the group consisting of copper nitrate, copper formate, copper sulfate, copper oxalate, nickel nitrate, nickel formate, nickel sulfate, nickel oxalate, nickel acetate, nickel thiocyanate, iron nitrate, iron sulfate, iron oxalate, iron acetate, manganese nitrate, manganese formate, manganese oxalate, cobalt nitrate, cobalt formate, cobalt sulfate, cobalt oxalate, cobalt thiocyanate, chromium nitrate, chromium sulfate, magnesium acetate, magnesium sulfate, neodymium nitrate, vanadium sulfate, vanadyl sulfate, zirconium nitrate, zinc nitrate, zinc sulfate, silver nitrate, yttrium nitrate, and combinations thereof.

8. The method as defined in claim 1 wherein the metal salt is selected from the group consisting of copper nitrate, copper formate, copper sulfate, nickel nitrate, nickel formate, nickel sulfate, nickel acetate, nickel thiocyanate, iron nitrate, iron sulfate, iron acetate, manganese nitrate, manganese formate, cobalt nitrate, cobalt formate, cobalt sulfate, cobalt thiocyanate, chromium nitrate, chromium sulfate, magnesium acetate, magnesium sulfate, neodymium nitrate, vanadium sulfate, vanadyl sulfate, zirconium nitrate, zinc nitrate, zinc sulfate, yttrium nitrate, and combinations thereof.

* * * * *